US011190317B2

United States Patent
Gomi

(10) Patent No.: US 11,190,317 B2
(45) Date of Patent: Nov. 30, 2021

(54) TRANSMITTING TERMINAL, TRANSMITTING METHOD, INFORMATION PROCESSING TERMINAL, AND INFORMATION PROCESSING METHOD

(71) Applicant: SONY CORPORATION, Tokyo (JP)

(72) Inventor: Hideho Gomi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/635,249

(22) PCT Filed: Jul. 26, 2018

(86) PCT No.: PCT/JP2018/028032
§ 371 (c)(1),
(2) Date: Jan. 30, 2020

(87) PCT Pub. No.: WO2019/031258
PCT Pub. Date: Feb. 14, 2019

(65) Prior Publication Data
US 2020/0374069 A1    Nov. 26, 2020

(30) Foreign Application Priority Data

Aug. 8, 2017 (JP) .............................. JP2017-153198

(51) Int. Cl.
*H04L 12/24* (2006.01)
*H04L 29/06* (2006.01)
*H04L 5/00* (2006.01)

(52) U.S. Cl.
CPC .......... *H04L 5/0048* (2013.01); *H04L 5/0044* (2013.01); *H04L 41/145* (2013.01); *H04L 41/16* (2013.01); *H04L 65/608* (2013.01)

(58) Field of Classification Search
CPC ....... H04L 29/06; H04L 29/08; H04L 41/145; H04L 41/16; H04L 5/0044; H04L 5/0048; H04L 65/608
(Continued)

(56) References Cited

U.S. PATENT DOCUMENTS 5,727,157 A     3/1998  Orr et al.
2016/0352764 A1* 12/2016  Mermoud ........... H04L 63/1425

FOREIGN PATENT DOCUMENTS

| AU | 675362 B2   | 1/1997 |
| JP | 09-504913 A | 5/1997 |
| WO | 95/006989 A1 | 3/1995 |

OTHER PUBLICATIONS

International Search Report and Written Opinion of PCT Application No. PCT/JP2018/028032, dated Aug. 28, 2018, 09 pages of ISRWO.

* cited by examiner

*Primary Examiner* — Mohammad S Anwar
*Assistant Examiner* — Natali Pascual Peguero
(74) *Attorney, Agent, or Firm* — Chip Law Group

(57) ABSTRACT

The present technology relates to a transmitting terminal, a transmitting method, an information processing terminal, and an information processing method that make it possible to efficiently perform transmission of multiple pieces of data. A transmitting terminal according to an aspect of the present technology generates and transmits a packet having a format that allows multiple pieces of transmission data to be stored together with identification information of a network model in a payload. The multiple pieces of transmission data are used in at least one of learning processing of the network model by machine learning or inference processing based on the network model. The present technology is able to be applied to a transmission system that transmits (Continued)

data used in learning processing of a network model by machine learning and inference processing based on the network model.

17 Claims, 24 Drawing Sheets

(58) Field of Classification Search
USPC .......................................... 370/329, 330, 331
See application file for complete search history.

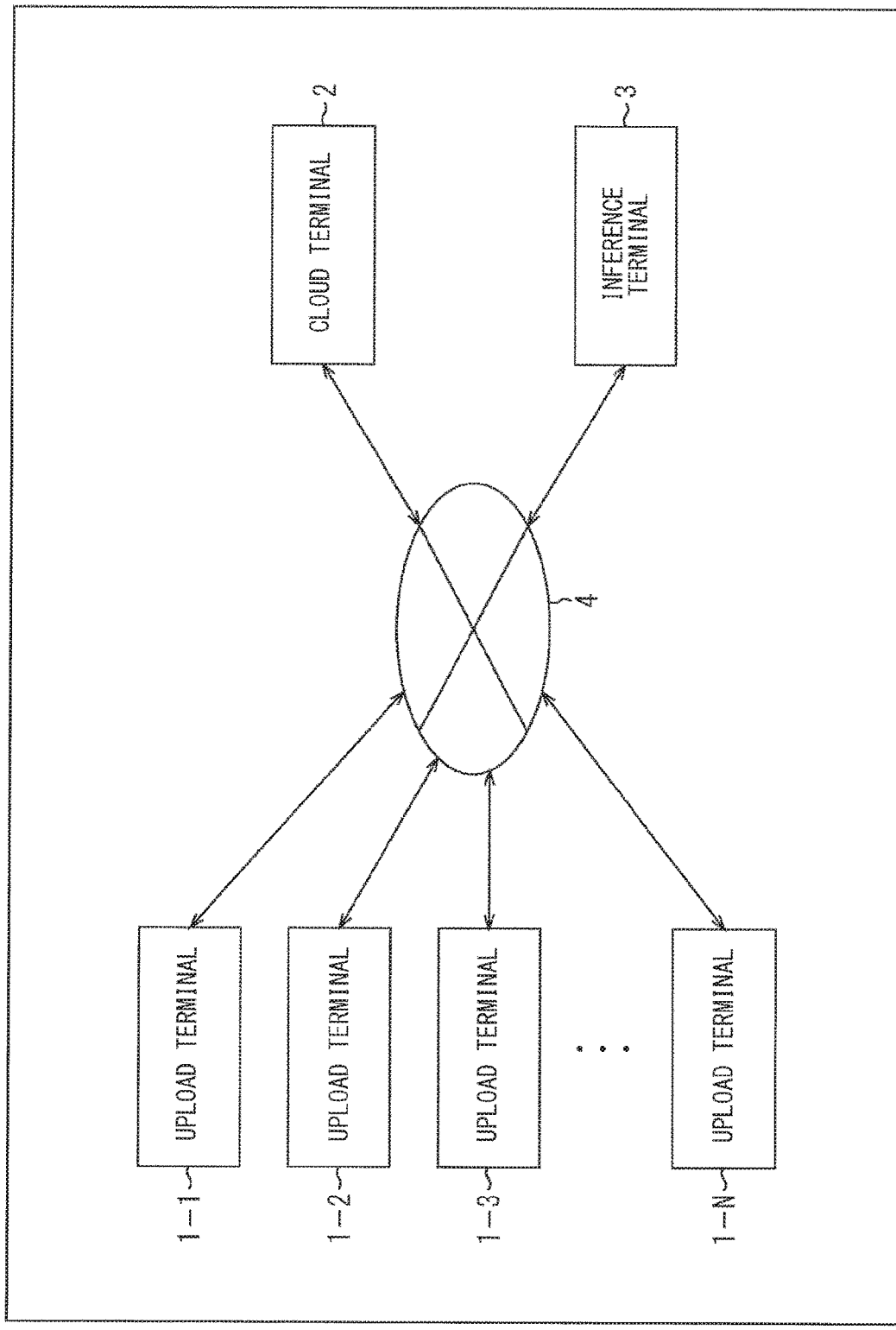
[FIG. 1]

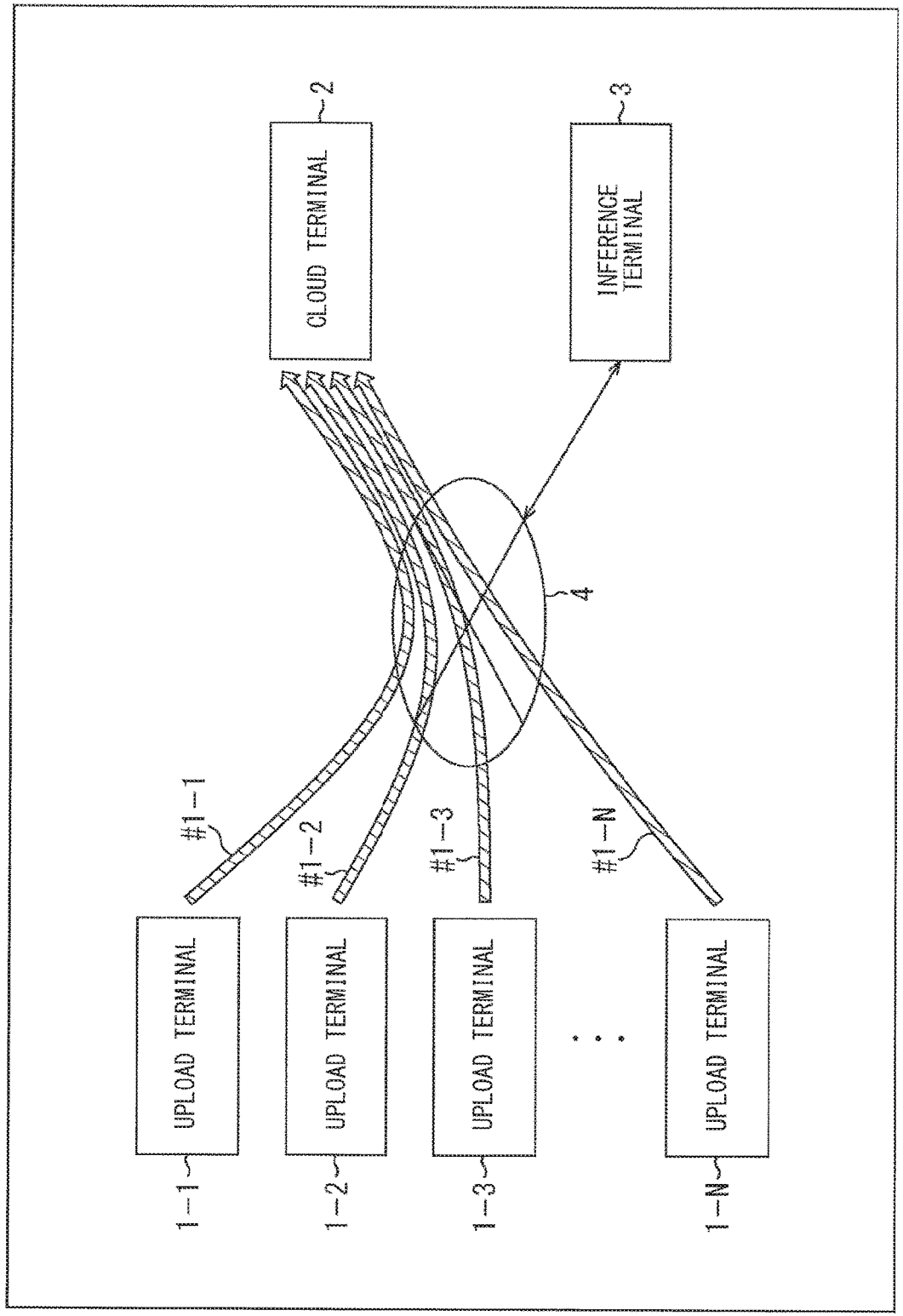

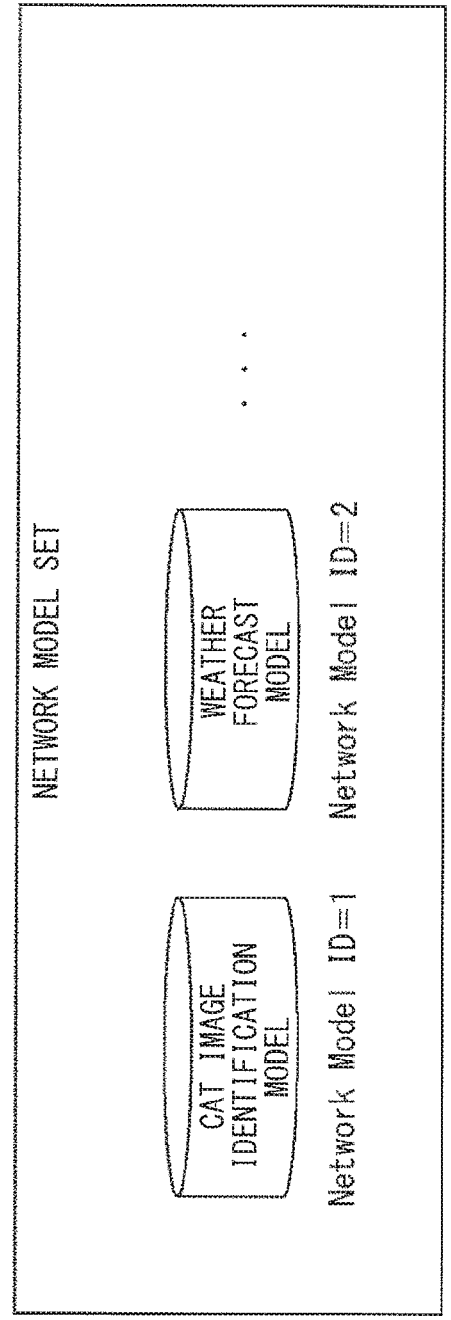
[FIG. 3]

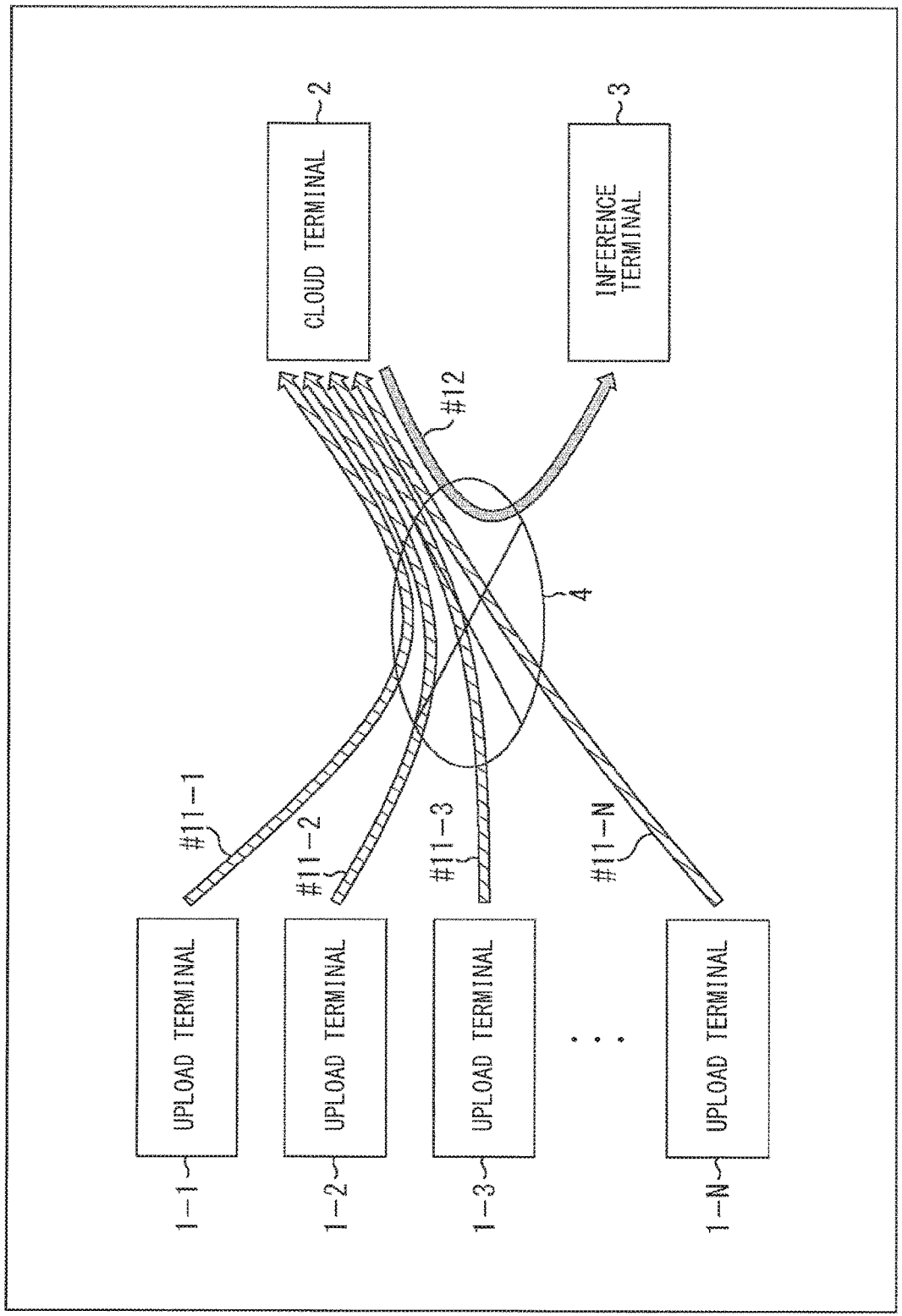
[FIG. 4]

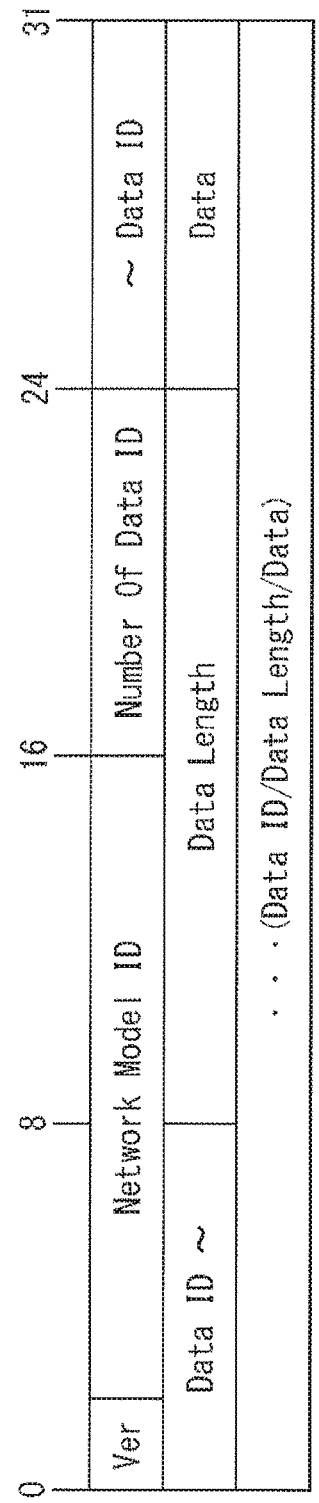
[FIG. 6]

[FIG. 7]

| NAME OF FIELD | EXPLANATION |
|---|---|
| Ver | VERSION NUMBER (2[bit]) |
| Network Model ID | IDENTIFIER OF NETWORK MODEL (14[bit]) |
| Number Of Data ID | NUMBER OF Data IDs (8[bit]) |
| Data ID | ID INDICATING DATA (16[bit]) |
| Data Length | LENGTH OF DATA (16[bit]) |
| Data | ACTUAL DATA (VARIABLE LENGTH) |

[FIG. 8]
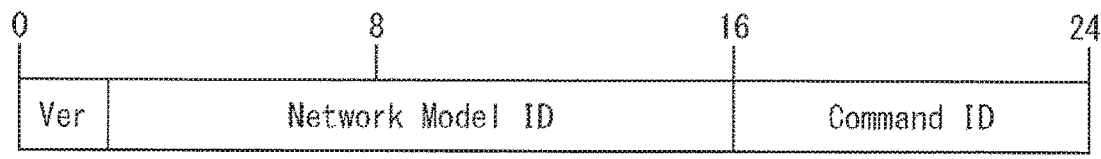

[FIG. 9]

| NAME OF FIELD | EXPLANATION |
|---|---|
| Ver | VERSION NUMBER (2[bit]) |
| Network Model ID | IDENTIFIER OF NETWORK MODEL (14[bit]) |
| Command ID | ID SPECIFYING CONTROL COMMAND (8[bit]) |

[FIG. 10]
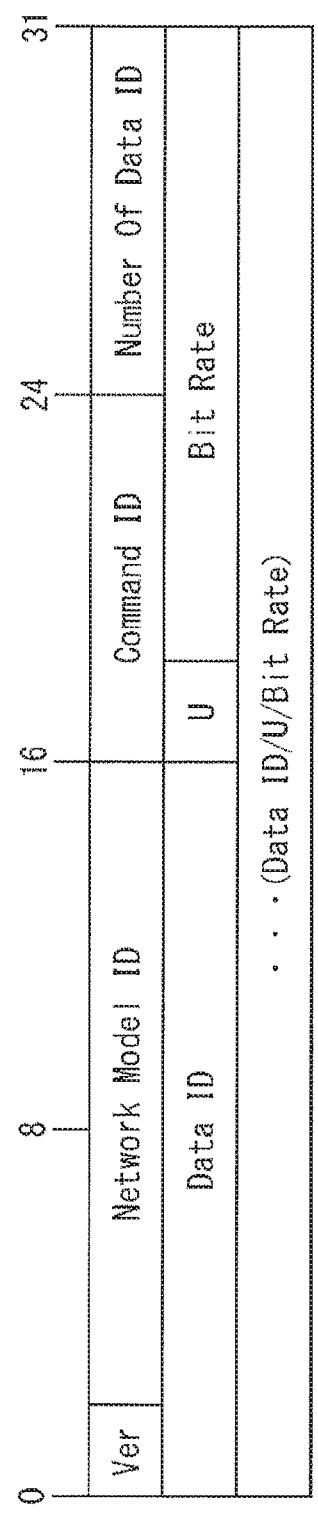

[FIG. 11]

| NAME OF FIELD | EXPLANATION |
|---|---|
| Ver | VERSION NUMBER (2[bit]) |
| Network Model ID | IDENTIFIER OF NETWORK MODEL (14[bit]) |
| Command ID | ID SPECIFYING CONTROL COMMAND (8[bit]) |
| Number Of Data ID | NUMBER OF Data IDs (8[bit]) |
| Data ID | ID INDICATING DATA (16[bit]) |
| U(K, M, G, R) | SPECIFY UNIT OF Bit Rate ([Kbps]=00, [Mbps]=01, [Gbps]=10, Reserve=11) (2[bit]) |
| Bit Rate | VALUE OF RATE (14[bit]) |

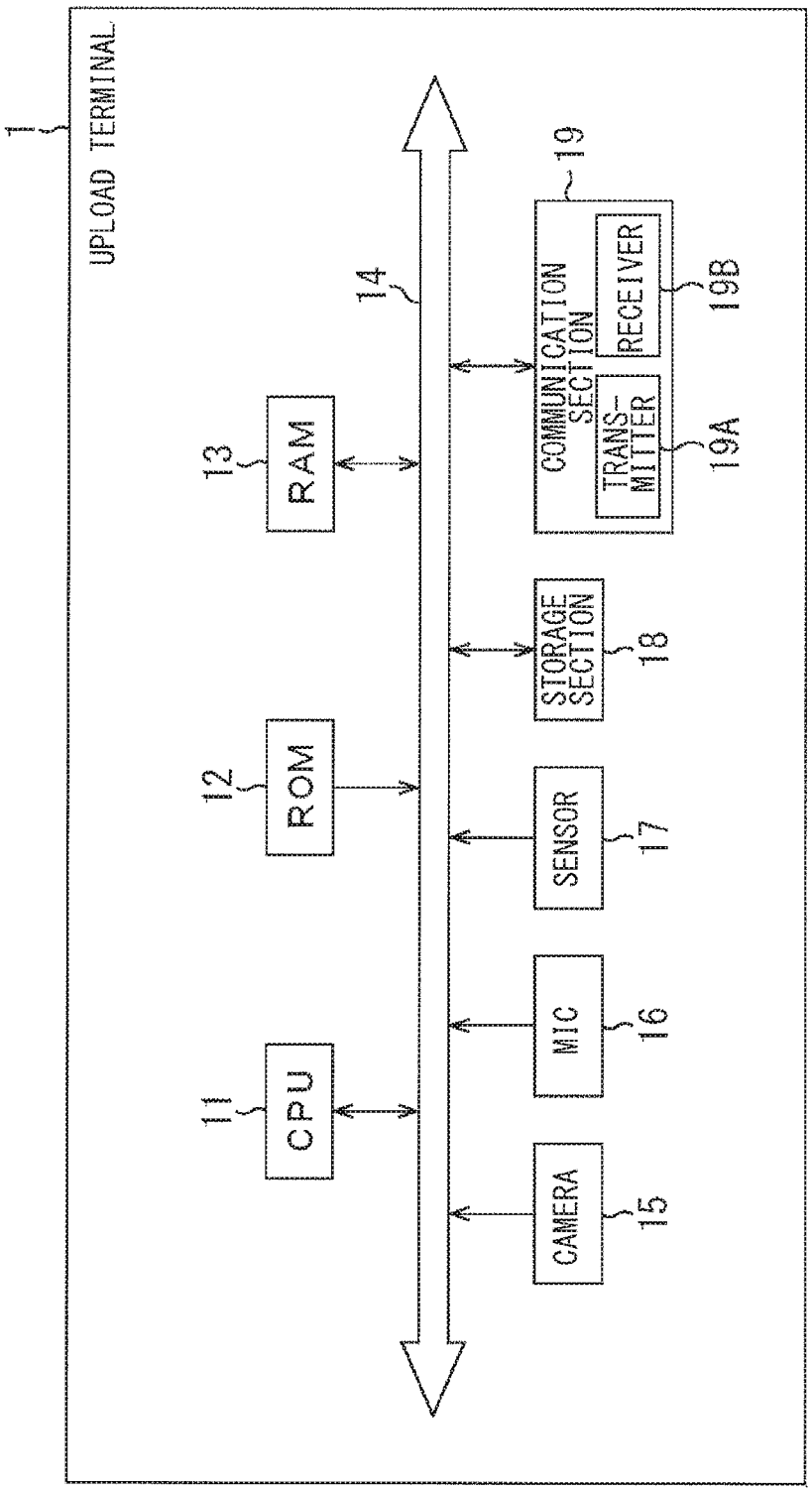

[FIG. 13]
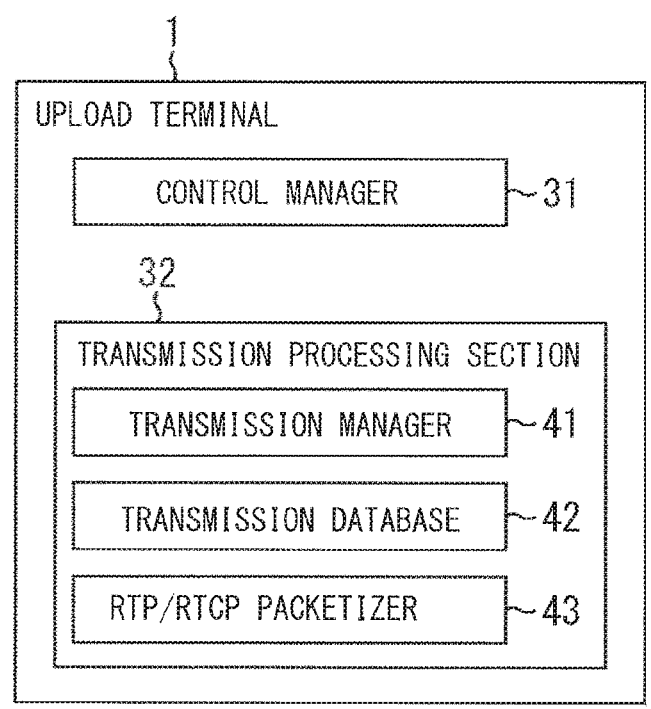

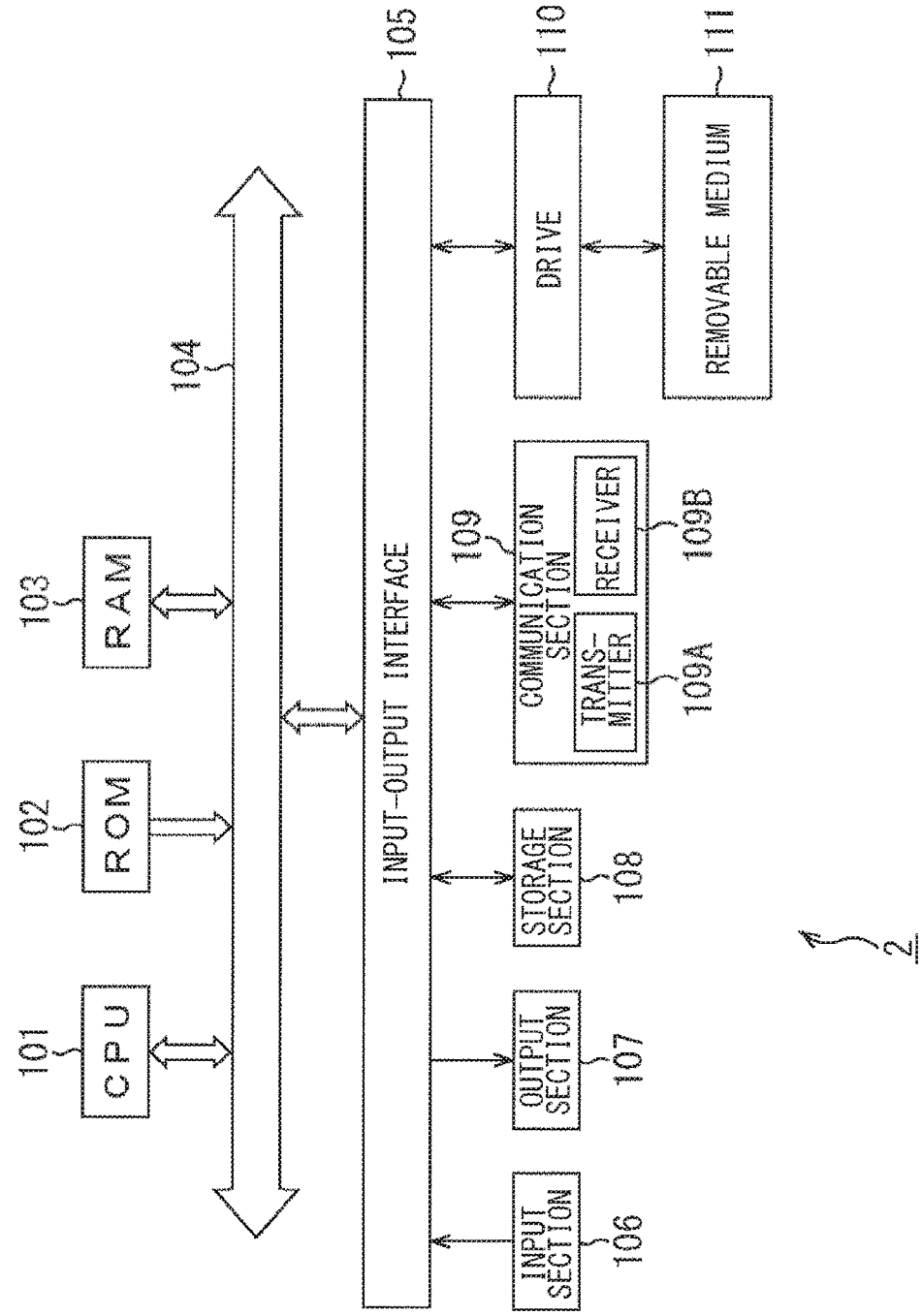
[FIG. 14]

[FIG. 15]
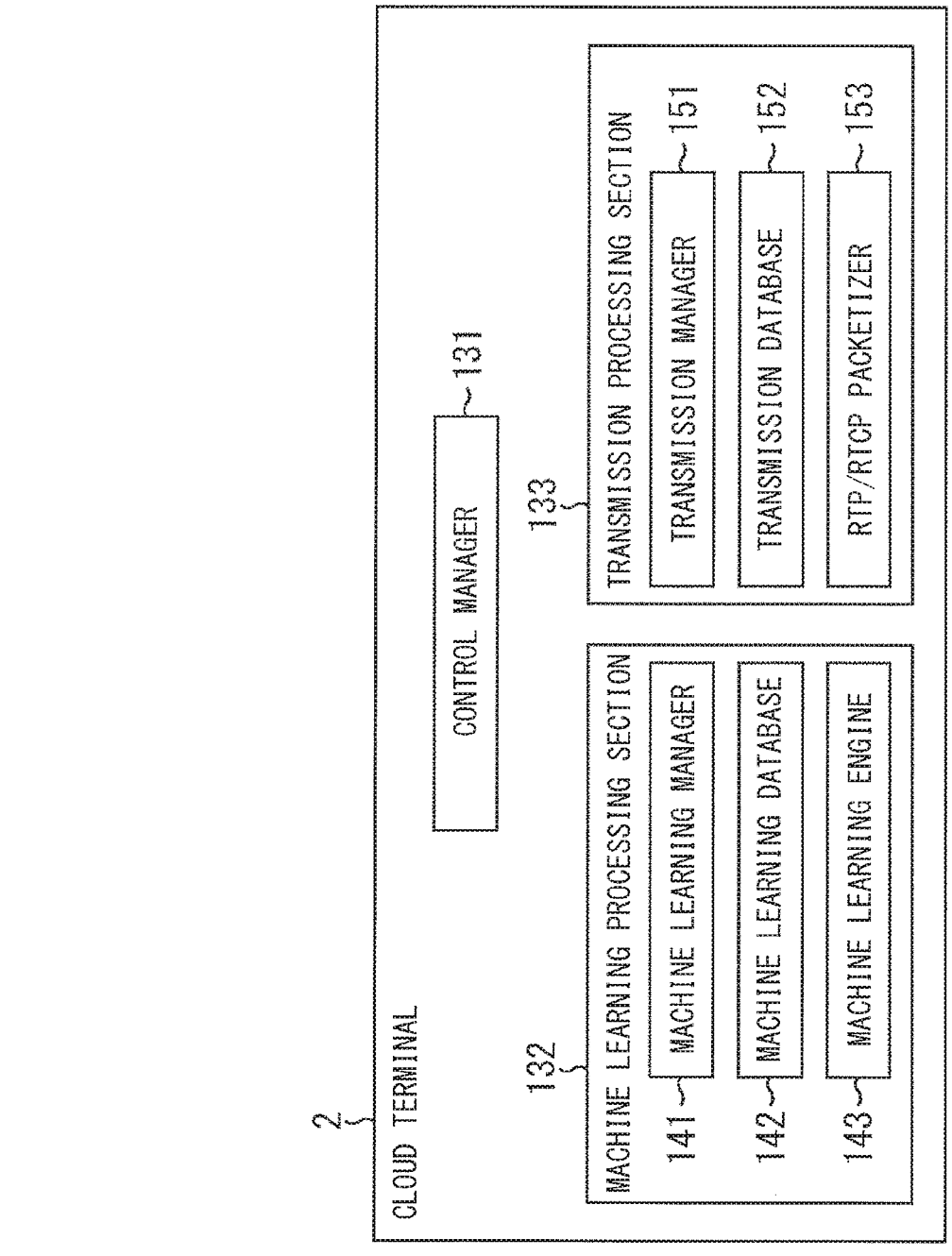

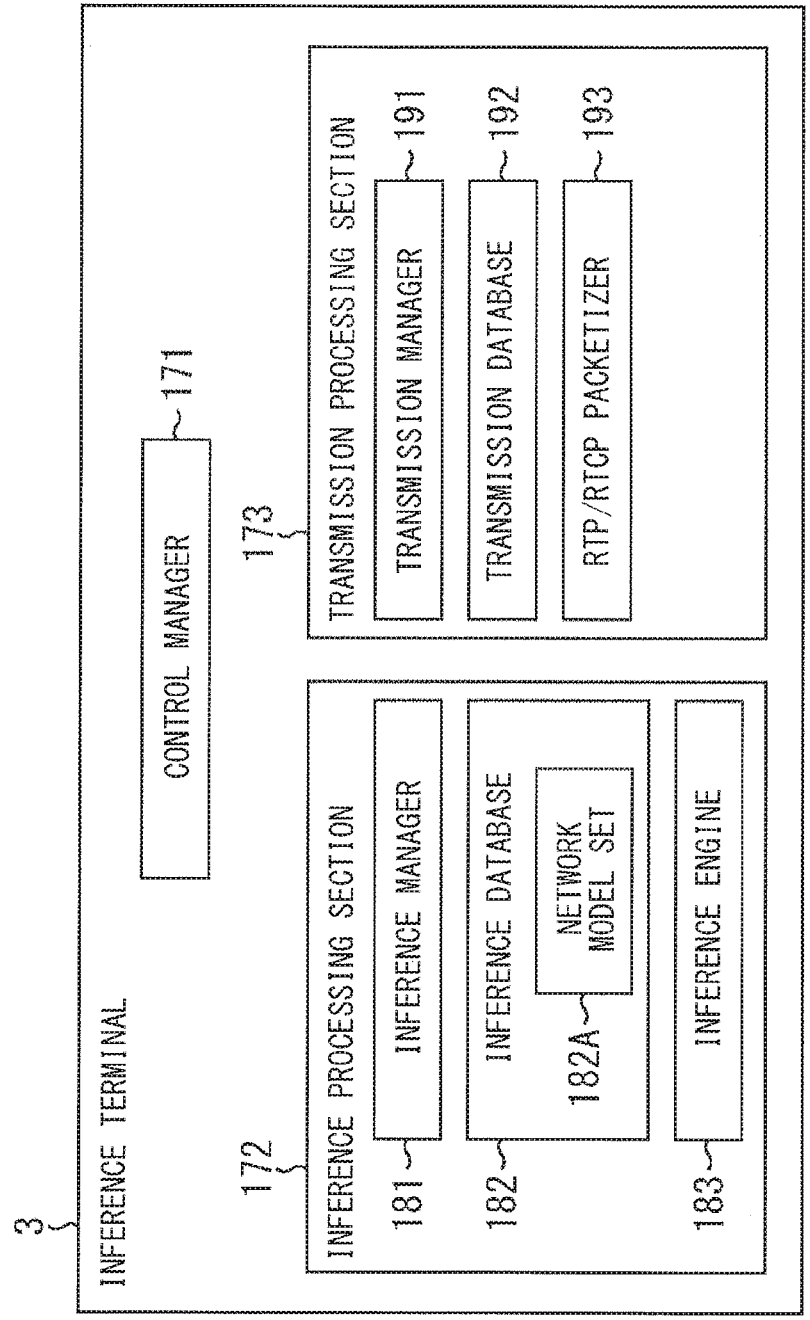
[FIG. 16]

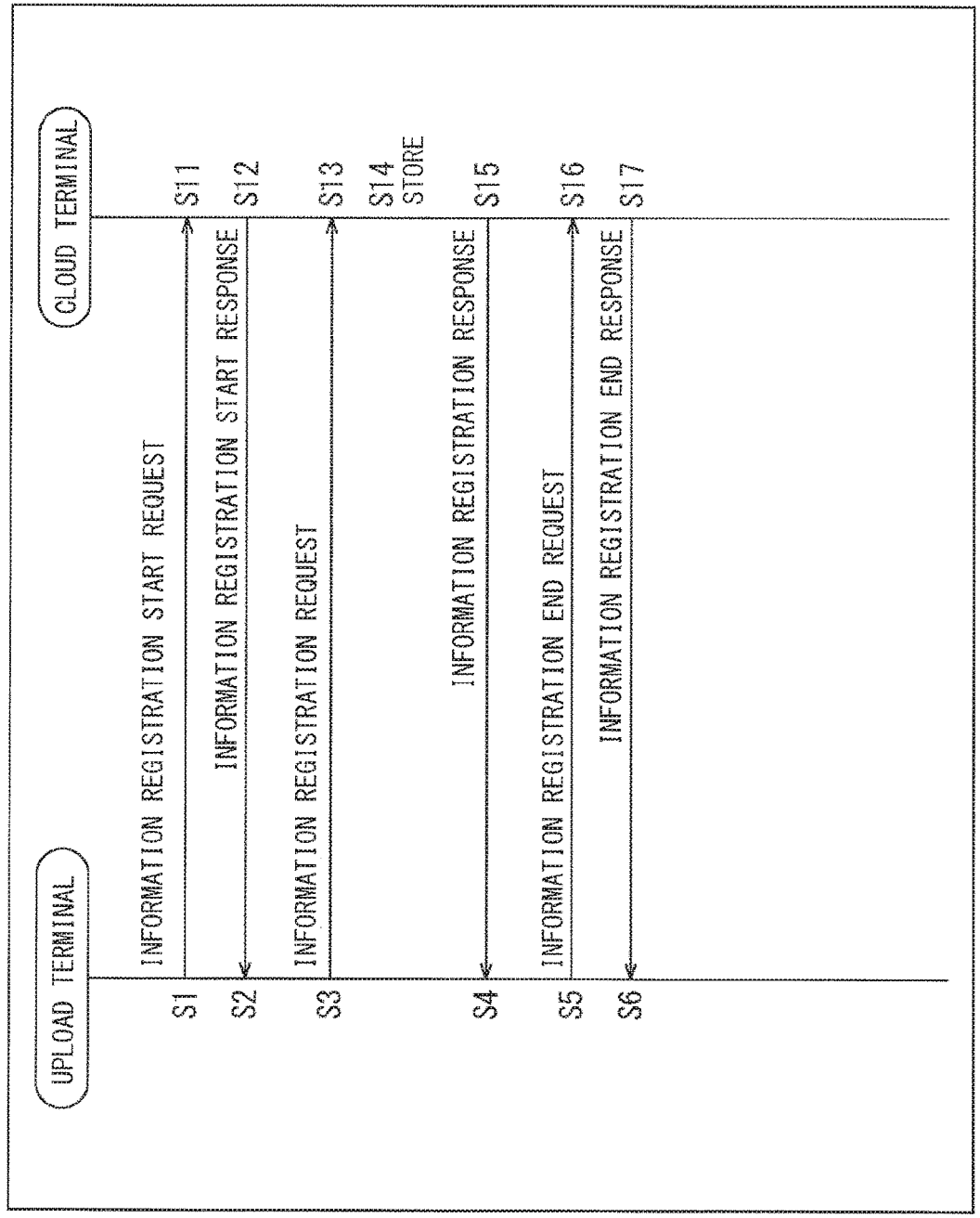
[FIG. 17]

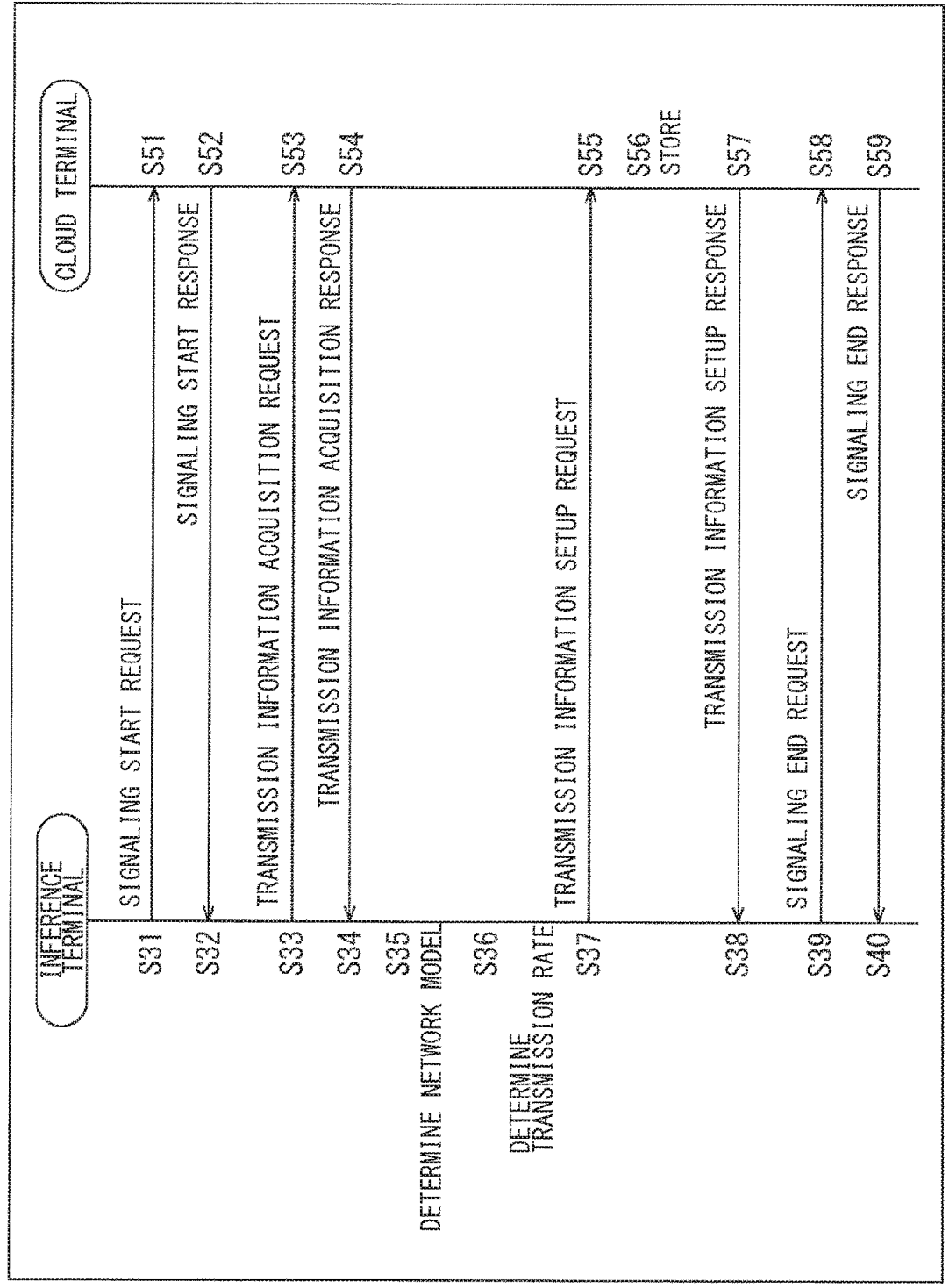
[FIG. 18]

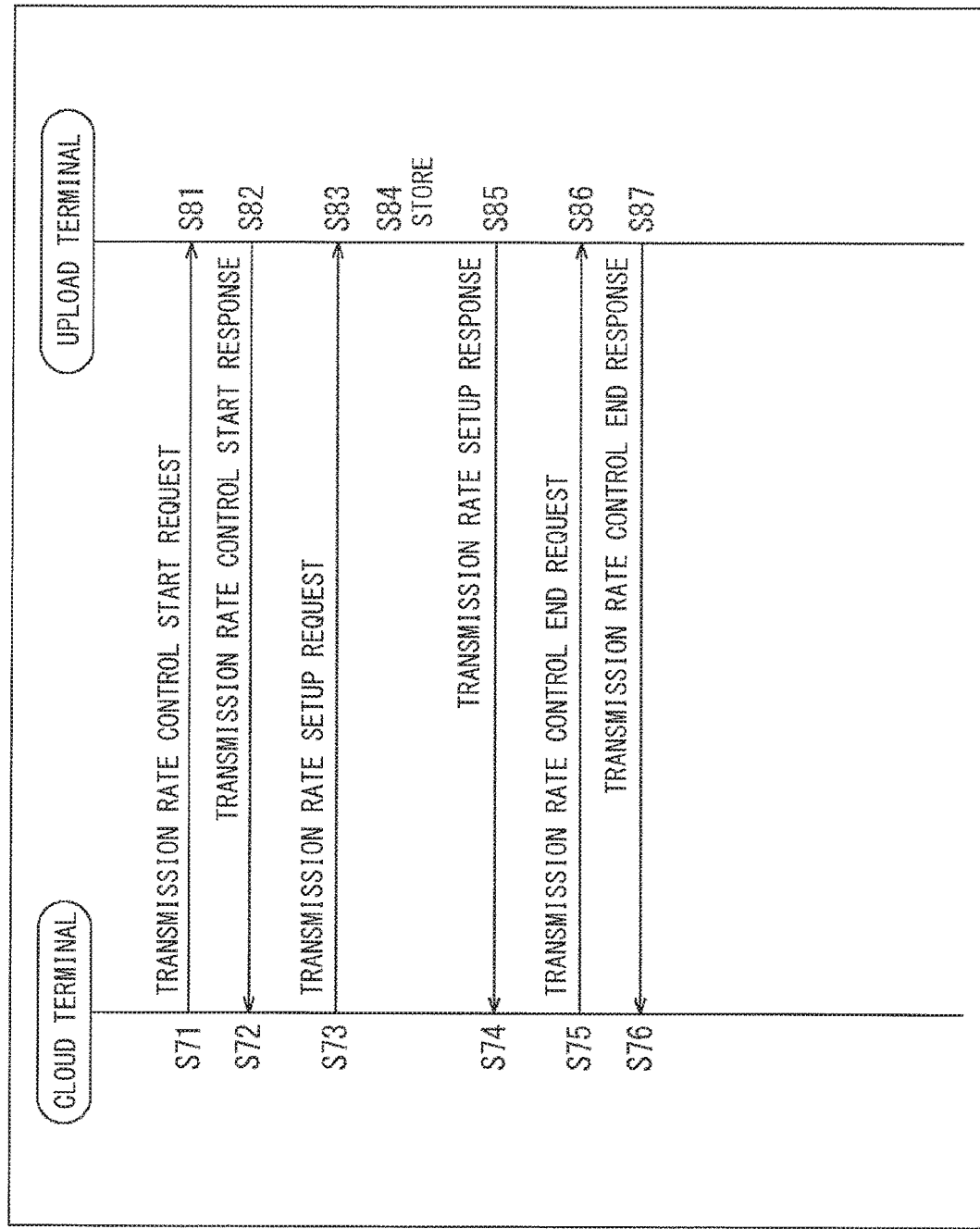
[FIG. 19]

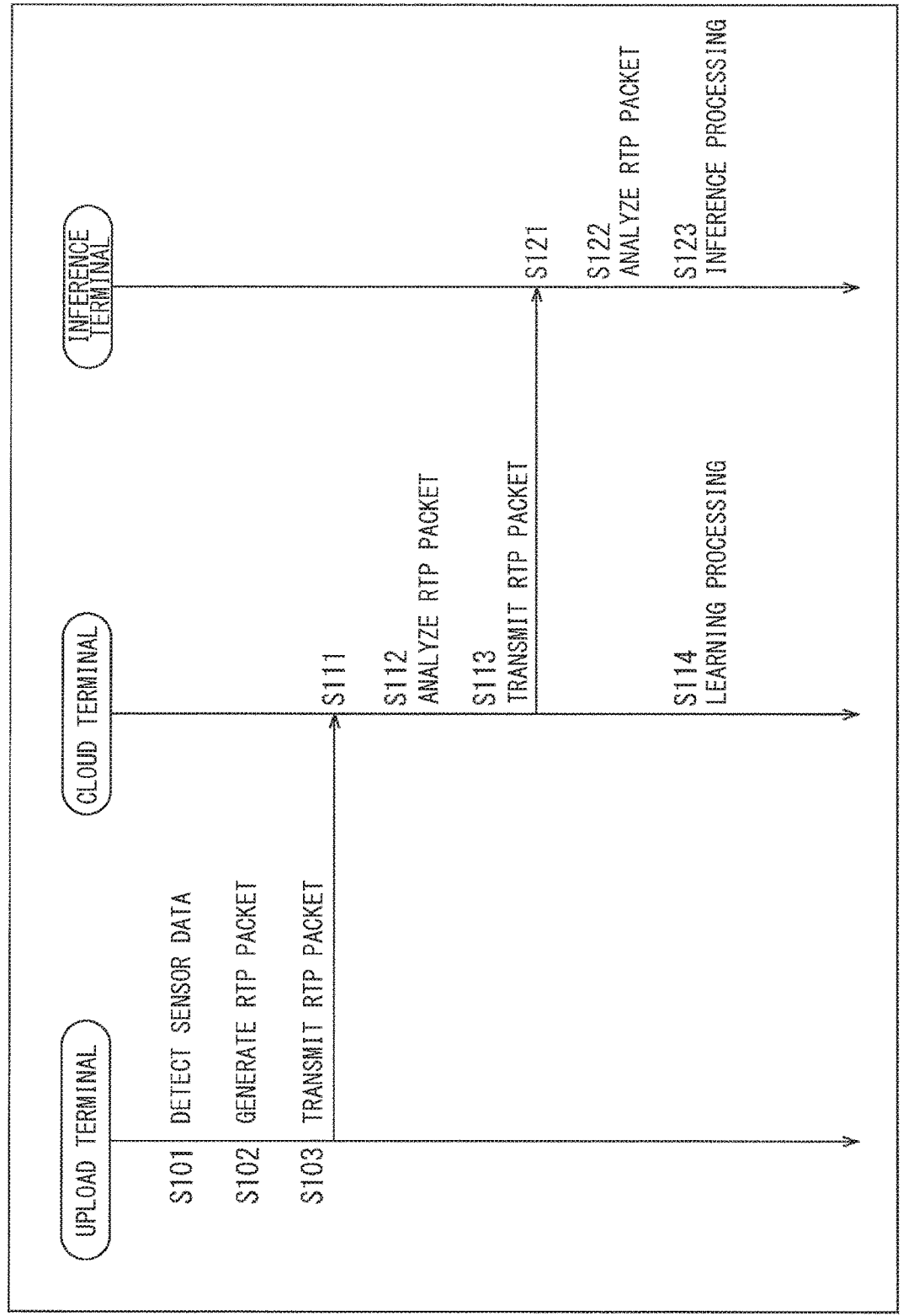
[FIG. 20]

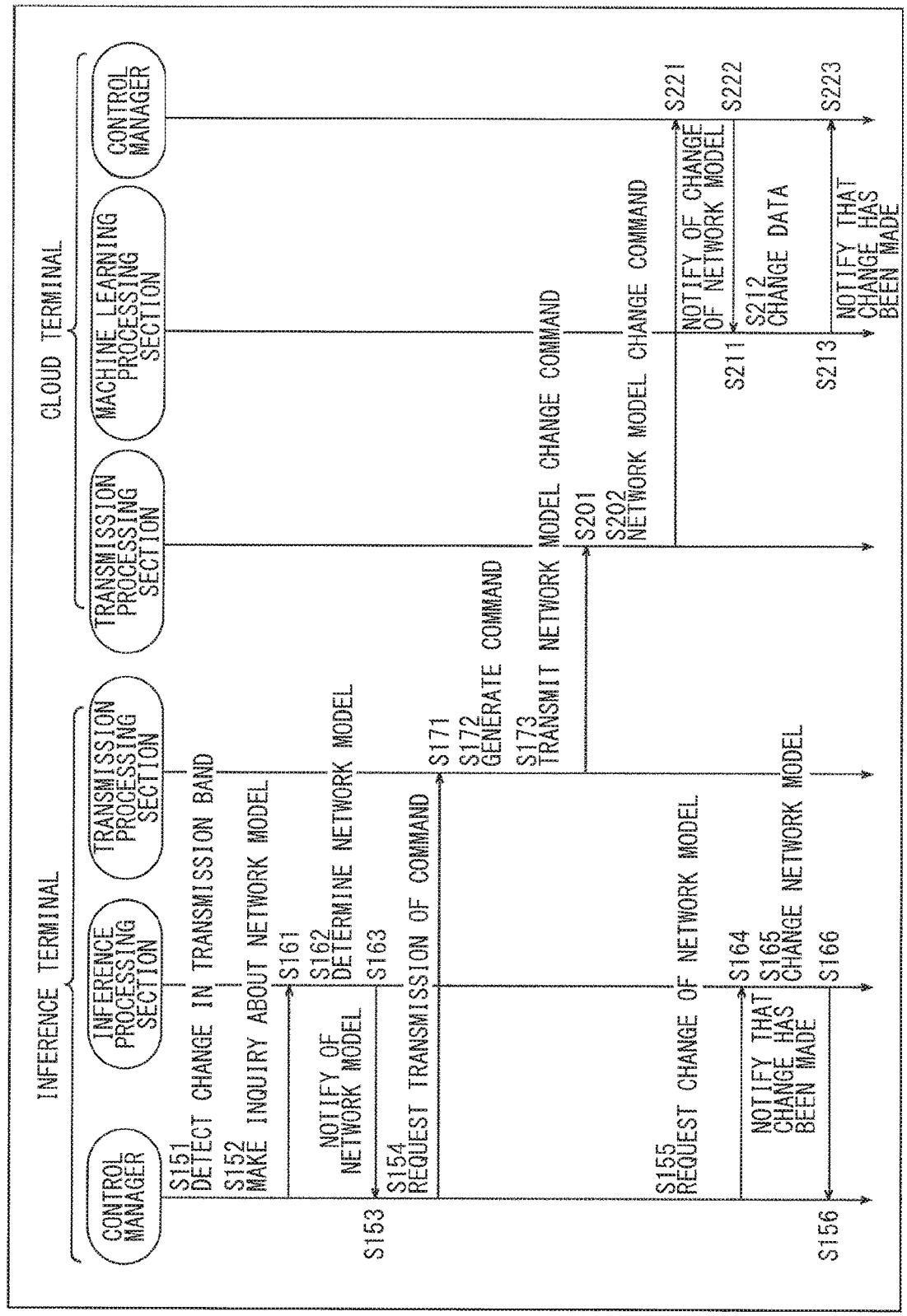
[FIG. 21]

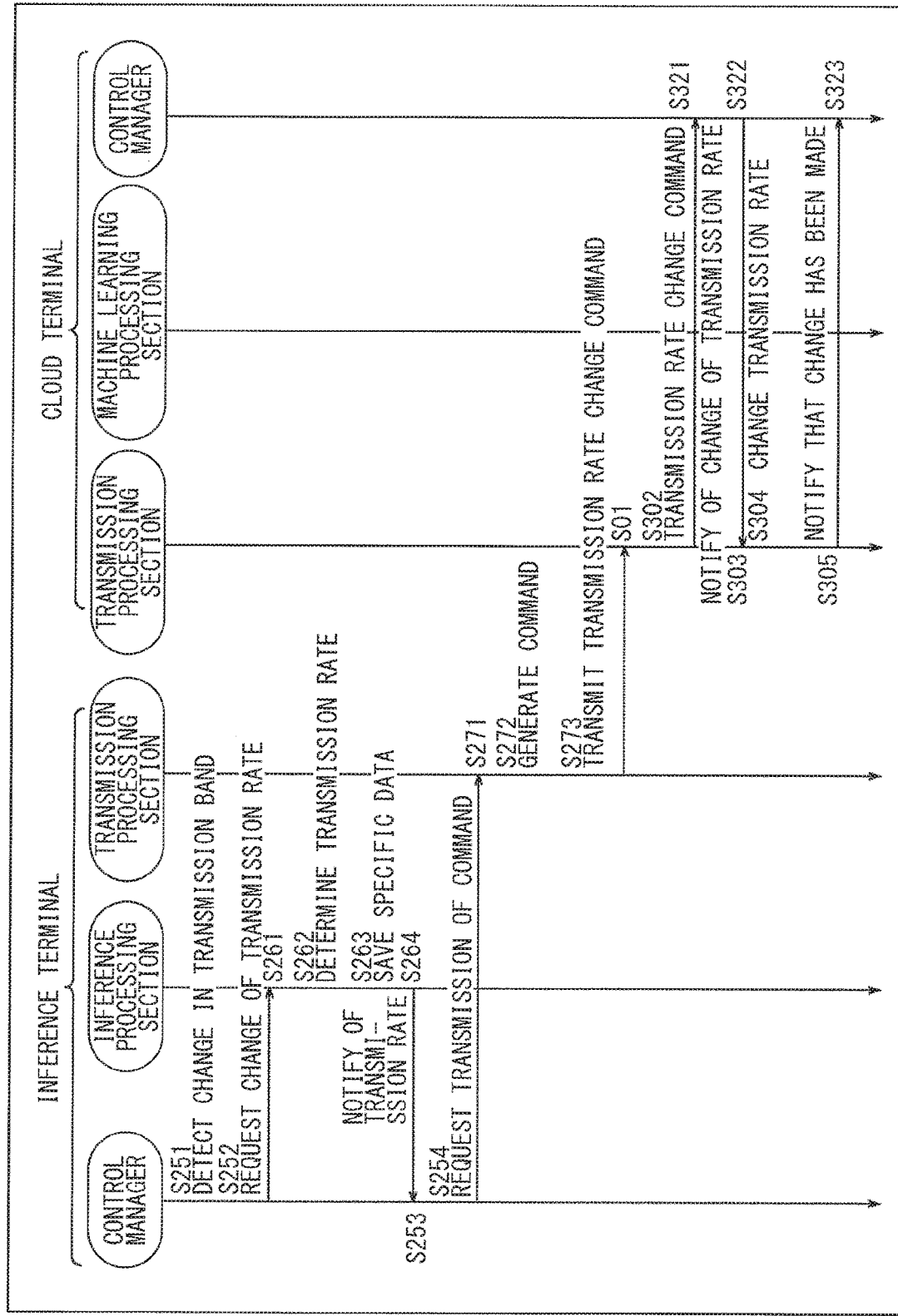
[FIG. 22]

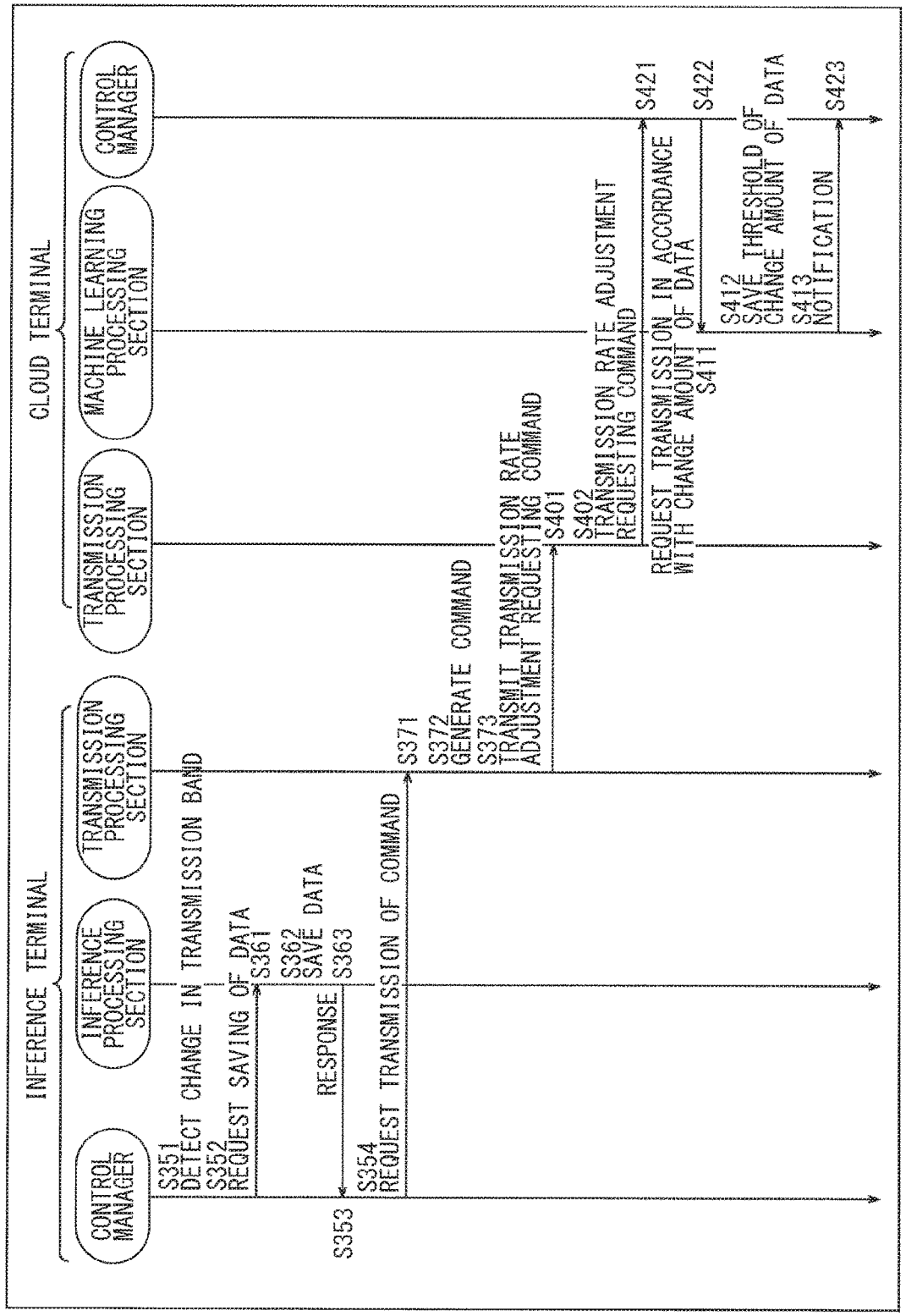
[FIG. 23]

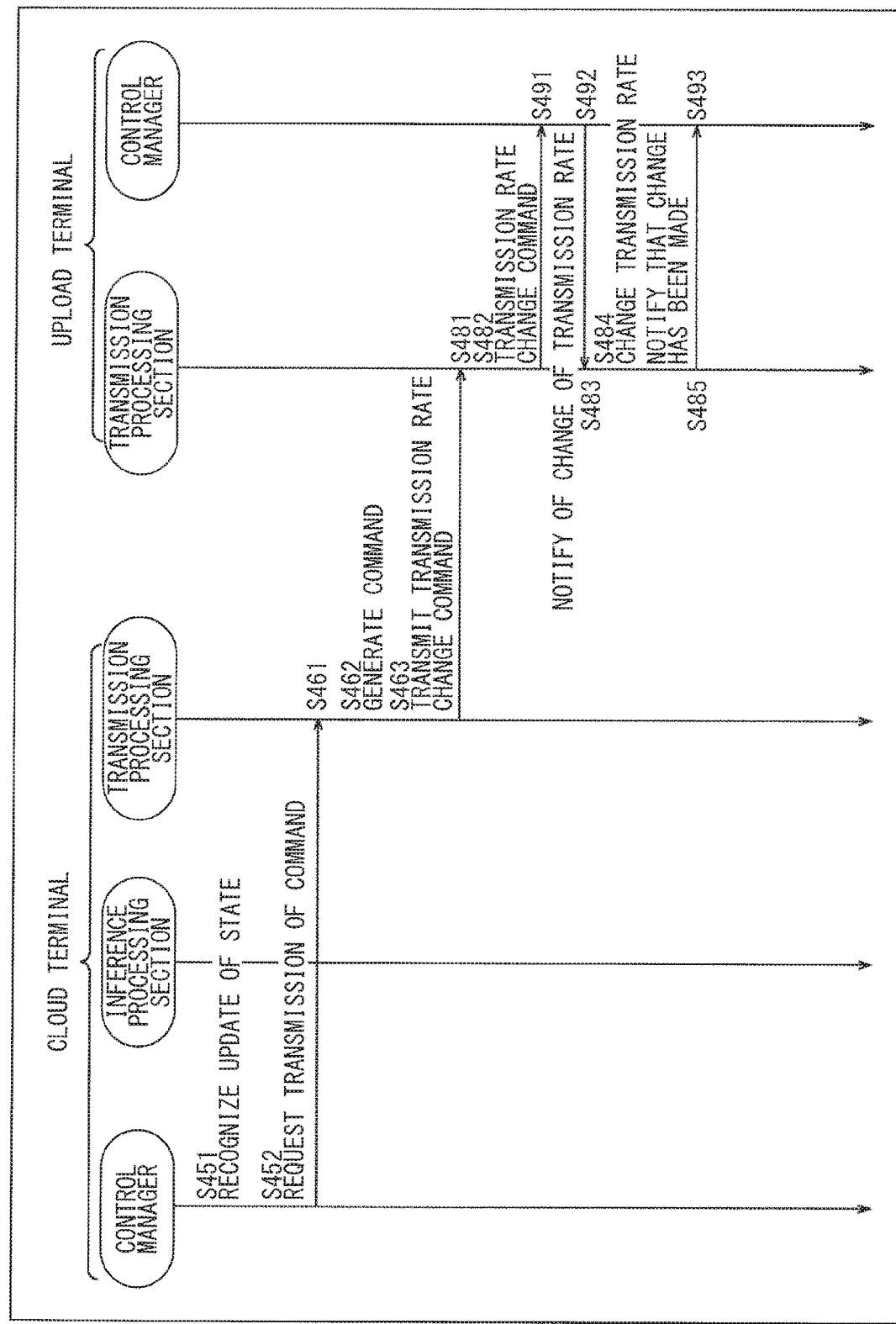
[FIG. 24]

TRANSMITTING TERMINAL, TRANSMITTING METHOD, INFORMATION PROCESSING TERMINAL, AND INFORMATION PROCESSING METHOD

CROSS REFERENCE TO RELATED APPLICATIONS

This application is a U.S. National Phase of International Patent Application No. PCT/JP2018/028032 filed on Jul. 26, 2018, which claims priority benefit of Japanese Patent Application No. JP 2017-153198 filed in the Japan Patent Office on Aug. 8, 2017. Each of the above-referenced applications is hereby incorporated herein by reference in its entirety.

TECHNICAL FIELD

The present technology relates to a transmitting terminal, a transmitting method, an information processing terminal, and an information processing method, and particularly to a transmitting terminal, a transmitting method, an information processing terminal, and an information processing method that make it possible to efficiently perform transmission of multiple pieces of data.

BACKGROUND ART

There is Message Queue Telemetry Transport for Sensor Network (MQTT-SN) as a protocol based on the assumption that data such as sensor data used in machine learning is asynchronously transmitted on a user datagram protocol (UDP).

CITATION LIST

Patent Literature

NPTL 1: IBM developerWorks, "MQTT V3.1 Protocol Specification (English version)", [searched on 7 Jul. 2017], <URL: http://public.dhe.ibm.com/software/dw/webservices/ws-mqtt/MQTT_V3.1_Protocol_Specific.pdf>
NPTL 2: IBM developerWorks, "MQTT V3.1 Protocol Specification (Japanese version)", [searched on 7 Jul. 2017], <URL: http://public.dhe.ibm.com/software/dw/jp/websphere/wmq/mqtt31_spec/mqtt-v3r1_ja.pdf>

SUMMARY OF THE INVENTION

Problem to be Solved by the Invention

MQTT is aimed for transmission of small-size data (payload length: up to 256 [Mbytes]), and does not take into account transmission of large-volume data that multiple pieces of data, such as multimodal data, are bulked up.

Furthermore, MQTT does not accommodate application functions such as checking variation in the state of a transmission path between devices and controlling the transmission rate in accordance with variation in the state of the transmission path as with the Real-Time Transport Protocol (RTP)/Real-Time Transport Control Protocol (RTCP).

The present technology has been made in view of such circumstances, and is intended to make it possible to efficiently perform transmission of multiple pieces of data.

Means for Solving the Problem

A transmitting terminal according to a first aspect of the present technology includes: a generator that generates a packet having a format that allows multiple pieces of transmission data to be stored together with identification information of a network model in a payload, the transmission data being used in at least one of learning processing of the network model by machine learning or inference processing based on the network model; and a transmitter that transmits the packet.

In the first aspect of the present technology, a packet having a format that allows multiple pieces of transmission data to be stored together with identification information of a network model in a payload is generated, and the packet is transmitted. The multiple pieces of transmission data are used in at least one of learning processing of the network model by machine learning or inference processing based on the network model.

An information processing terminal according to a second aspect of the present technology includes: a generator that generates a control packet storing a control command regarding transmission of transmission data used in inference processing based on a network model in a payload, the control command including identification information of the network model and identification information of the control command; and a transmitter that transmits the control packet.

In the second aspect of the present technology, a control packet storing a control command regarding transmission of transmission data used in inference processing based on a network model in a payload is generated, and the control packet is transmitted. The control command includes identification information of the network model and identification information of the control command.

An information processing terminal according to a third aspect of the present technology includes: a receiver that receives a control packet storing a control command regarding transmission of transmission data used in inference processing based on a network model in a payload, the control command including identification information of the network model and identification information of the control command; and a transmitter that transmits the transmission data in accordance with the control command.

In the third aspect of the present technology, a control packet storing a control command regarding transmission of transmission data used in inference processing based on a network model in a payload is received, and the transmission data is transmitted in accordance with the control command. The control command includes identification information of the network model and identification information of the control command.

Effects of the Invention

According to the present technology, it is possible to efficiently perform transmission of multiple pieces of data.

It is to be noted that the effects described here are not necessarily limitative, and there may be any of effects described in the present disclosure.

BRIEF DESCRIPTION OF DRAWINGS

FIG. 1 is a block diagram illustrating a configuration example of a transmission system according an embodiment of the present technology.

FIG. 2 is a diagram illustrating the flow of transmission data at the time of network model learning.

FIG. 3 is a diagram illustrating an example of a network model.

FIG. 4 is a diagram illustrating the flow of the transmission data at the time of inference using the network model.

FIG. 6 is a diagram illustrating an example of a format of a payload of the RTP packet.

FIG. 7 is a diagram illustrating respective contents of fields illustrated in FIG. 6.

FIG. 8 is a diagram illustrating an example of a first format of a control command region.

FIG. 9 is a diagram illustrating respective contents of fields illustrated in FIG. 8.

FIG. 10 is a diagram illustrating an example of a second format of the control command region.

FIG. 11 is a diagram illustrating respective contents of fields illustrated in FIG. 10.

FIG. 12 is a block diagram illustrating a hardware configuration example of an upload terminal.

FIG. 13 is a block diagram illustrating a functional configuration example of the upload terminal.

FIG. 14 is a block diagram illustrating a hardware configuration example of a cloud terminal.

FIG. 15 is a block diagram illustrating a functional configuration example of the cloud terminal.

FIG. 16 is a block diagram illustrating a functional configuration example of an inference terminal.

FIG. 17 is a flowchart that describes preprocessing performed between the upload terminal and the cloud terminal.

FIG. 18 is a flowchart that describes signaling processing performed between the cloud terminal and the inference terminal.

FIG. 19 is a flowchart that describes rate control processing performed between the upload terminal and the cloud terminal.

FIG. 20 is a flowchart that describes data transmission processing.

FIG. 21 is a flowchart that describes network model switching processing performed between the cloud terminal and the inference terminal.

FIG. 22 is a flowchart that describes transmission rate control processing performed between the cloud terminal and the inference terminal.

FIG. 23 is a flowchart that describes transmission control processing performed between the cloud terminal and the inference terminal.

FIG. 24 is a flowchart that describes transmission rate control processing performed between the upload terminal and the cloud terminal.

MODES FOR CARRYING OUT THE INVENTION

Figure 5A:
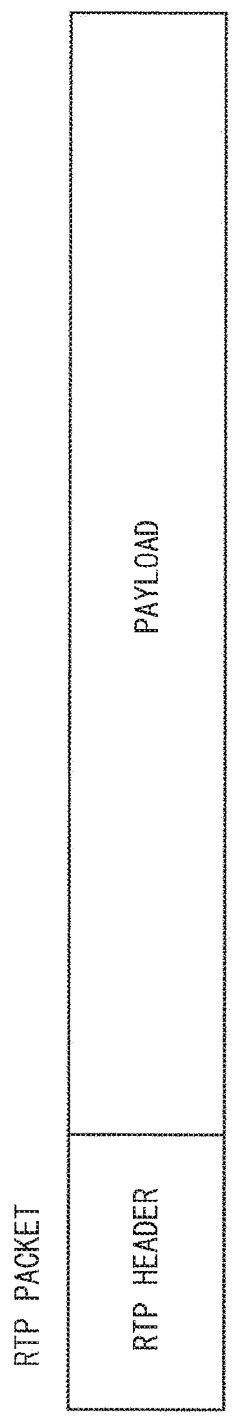
FIGS. 5A and 5B are diagrams illustrating an example of an RTP packet and an RTCP packet.

An embodiment of the present technology is described below. Description is given in the following order.
1. Configuration Example of Transmission System
2. Packet Format
3. Configuration Example of Each Device
4. Operation of Transmission System
5. Other Examples

1. CONFIGURATION EXAMPLE OF TRANSMISSION SYSTEM

FIG. 1 is a block diagram illustrating a configuration example of a transmission system according an embodiment of the present technology.

The transmission system illustrated in FIG. 1 is constructed by upload terminals 1-1 to 1-N, a cloud terminal 2, and an inference terminal 3 being coupled through a network 4 such as the Internet.

The upload terminals 1-1 to 1-N are each a terminal including one or more sensors, and repeatedly make measurements. The upload terminals 1-1 to 1-N include, for example, a camera, a microphone (a mic), and various sensors such as an acceleration sensor, an angular velocity sensor, a geomagnetic sensor, an illuminance sensor, a temperature sensor, a barometric pressure sensor, and a positioning sensor. The upload terminals 1-1 to 1-N may be provided with a sensor that detects user's biometric information, such as the pulse, perspiration, or brain waves.

Each time the upload terminals 1-1 to 1-N make a measurement, they transmit (upload), as transmission data, sensor data indicating a result of the measurement to the cloud terminal 2. Hereinafter, unless it is necessary to discriminate among the upload terminals 1-1 to 1-N, they are collectively referred to as the upload terminal 1 as appropriate.

The cloud terminal 2 receives transmission data transmitted from the upload terminal 1. At the time of network model learning by machine learning, the cloud terminal 2 uses the transmission data transmitted from the upload terminal 1 to perform learning of a network model such as a neural network (NN).

FIG. 2 is a diagram illustrating the flow of transmission data at the time of network model learning.

At the time of network model learning, as indicated by arrows #1-1 to #1-N, a variety of sensor data are transmitted from each of the upload terminals 1-1 to 1-N to the cloud terminal 2. The cloud terminal 2 performs learning processing on the basis of the sensor data, thereby generating various network models illustrated in FIG. 3.

In an example of FIG. 3, a cat image identification model and a weather forecast model are illustrated. The cat image identification model is a network model using, for example, an image taken by the camera as an input to identify whether or not a subject of the image is a cat. Furthermore, the weather forecast model is a network model using, for example, multiple pieces of data of the temperature, the humidity, the wind force, etc. as inputs to forecast the weather.

Respective network models included in a network model set are network models using different types of data as an input to output a predetermined inference result. The respective network models are each set a Network Model ID that is an identifier.

Such a network model set generated through learning processing is supplied from the cloud terminal 2 to the inference terminal 3.

Furthermore, when the inference terminal 3 performs inference using a network model, the cloud terminal 2 transmits transmission data transmitted from the upload terminal 1 to the inference terminal 3.

FIG. 4 is a diagram illustrating the flow of transmission data at the time of inference using a network model.

Respective pieces of transmission data that have been transmitted from the upload terminals 1-1 to 1-N as indicated by arrows #11-1 to #11-N and received by the cloud terminal 2 are transmitted to the inference terminal 3 as indicated by an arrow #12.

As will be described later, a packet that has stored therein transmission data to be transmitted to the inference terminal 3 through the cloud terminal 2 includes a Network Model ID indicating which network model the transmission data stored in the packet is used as an input of.

The inference terminal 3 performs inference processing using transmission data transmitted from the cloud terminal 2 as an input of a network model identified by a Network Model ID. As well as being used by an application in the inference terminal 3, an inference result obtained through the inference processing may be transmitted to another device (not illustrated) and used by various applications.

For example, an inference result obtained through inference processing using the weather forecast model is transmitted to a server that provides a weather forecast. A user of a device, such as a smartphone or a tablet terminal, is able to check the weather forecast by operating the device and accessing the server.

Furthermore, for example, in a case where the upload terminal 1-1 is a terminal that is installed in an automobile and measures a context while the automobile is running, an inference result obtained by the inference terminal 3 is transmitted to a control device that controls the running of the automobile installed with the upload terminal 1-1. The control device performs, for example, cruise control for automatic operation on the basis of the inference result.

The transmission system illustrated in FIG. 1 is also a real-time processing system that performs network model learning processing and inference processing using a network model in real time each time transmission data is transmitted from the upload terminal 1.

RTP/RTCP is used for transmission of transmission data because the real time property is desired. The transmission data is stored in an RTP packet, and the RTP packet is transmitted from the upload terminal 1. Furthermore, transmission control in accordance with the state of a transmission path is performed using a control command stored in an RTCP packet.

Figure 5B:
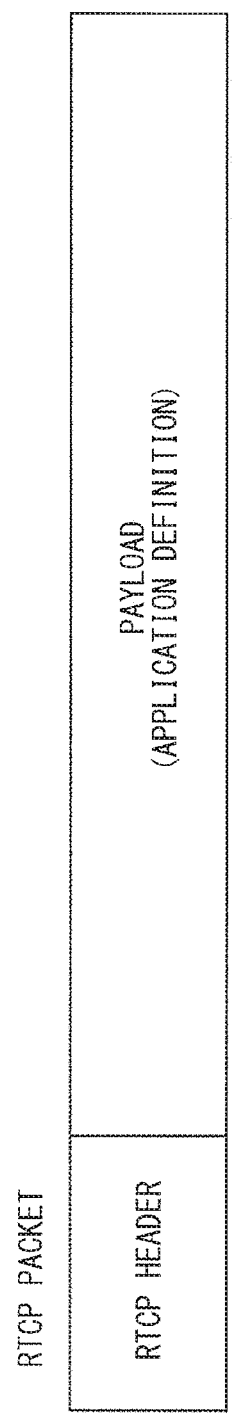

FIGS. 5A and 5B are diagrams illustrating an example of an RTP packet and an RTCP packet.

FIG. 5A illustrates a configuration of the RTP packet that stores therein sensor data as transmission data, and FIG. 5B illustrates a configuration of the RTCP packet that stores therein a control command.

The RTP packet illustrated in FIG. 5A is generated by storing the sensor data in a payload and adding an RTP header to the payload. Multiple types of sensor data are stored in the payload all together.

The control command including information regarding control of data transmission uses an application definition that is one of types of RTCP packets, and the RTCP packet illustrated in FIG. 5B is generated by an RTCP header being added. A payload has a region allocated for the control command. The control of data transmission using the RTCP packet is performed between the upload terminal 1 and the cloud terminal 2 and between the cloud terminal 2 and inference terminal 3.

2. PACKET FORMAT

Here are described respective formats of an RTP packet and an RTCP packet that are used in the transmission system illustrated in FIG. 1.

<Format of RTP Packet>

FIG. 6 is a diagram illustrating an example of a format of a payload of an RTP packet used for data transmission. FIG. 7 is a diagram illustrating respective contents of fields illustrated in FIG. 6.

As illustrated in FIG. 6, the payload of the RTP packet includes fields of Version (Ver), Network Model ID, Number Of Data ID, Data ID, Data Length, and Data. As many sets of Data ID, Data Length, and Data as a number indicated in Number Of Data ID are stored.

A Network Model ID is an identifier of a network model. At the time of network model learning, the Network Model ID indicates which network model the transmission data stored in the payload is used for learning of. Furthermore, at the time of inference using a network model, the Network Model ID indicates which network model the transmission data stored in the payload is used as an input of.

A Number Of Data ID indicates the number of Data IDs. The number of pieces of transmission data stored in the payload is indicated by the Number Of Data ID.

A Data ID is an identifier of transmission data. A type of the transmission data stored in the payload is indicated by the Data ID. Different Data IDs are added to different types of transmission data.

A Data Length indicates the length of transmission data (Data).

Data is actual transmission data. The transmission data is variable-length data.

It is to be noted that a correspondence relationship between a Network Model ID and a Network Model name and a correspondence relationship between a Data ID and a Data name (a type of Data) are each defined as specifications.

For example, "Network Model ID=1" is defined as an ID indicating "Network Model name=cat image identification model" described with reference to FIG. 3. Furthermore, "Data ID=1" is defined as an ID indicating "Data name=image".

In this case, "1" is set as a Network Model ID in a payload of an RTP packet to transmit an image used for learning of the cat image identification model and inference using the cat image identification model. Furthermore, the image itself is disposed next to Data Length that follows Data ID whose value is set to "1".

Moreover, "Network Model ID=2" is defined as an ID indicating "Network Model name=weather forecast model" described with reference to FIG. 3. "Data ID=2" is defined as an ID indicating "Data name=temperature"; "Data ID=3" is defined as an ID indicating "Data name=humidity"; and "Data ID=4" is defined as an ID indicating "Data name=wind force".

In this case, a value of "2" is set as a Network Model ID in a payload of an RTP packet to transmit three types of data of the temperature, the humidity, and the wind force used for learning of the weather forecast model and inference using the weather forecast model. Furthermore, a set of Data ID whose value is set to "2", Data Length, and temperature data, a set of Data ID whose value is set to "3", Data Length, and humidity data, and a set of Data ID whose value is set to "4", Data Length, and wind force data are disposed successively.

In this way, by using an RTP packet in the format illustrated in FIG. 6, it becomes possible to transmit multiple pieces of transmission data used for learning of some network model and inference using the network model all together. The pieces of data transmitted all together may be multimodal data of different types, or may be data of the same type.

<Format of RTCP Packet>

As a format of the control command region allocated in an extended region of a payload of an RTCP packet used for control of data transmission, for example, two types of formats are defined.

FIG. 8 is a diagram illustrating an example of a first format of the control command region. FIG. 9 is a diagram illustrating respective contents of fields illustrated in FIG. 8.

As illustrated in FIG. 8, the control command region includes fields of Version (Ver), Network Model ID, and Command ID.

A Network Model ID is an identifier of a network model.

A Command ID is an identifier specifying a control command. As will be described later, multiple types of contents (applications) of control commands are defined. The Command ID indicates which type of control command the control command is.

FIG. 10 is a diagram illustrating an example of a second format of the control command region. FIG. 11 is a diagram illustrating respective contents of fields illustrated in FIG. 10.

As illustrated in FIG. 10, the control command region includes fields of Version (Ver), Network Model ID, Command ID, Number Of Data ID, Data ID, U (K=00, M=01, G=10, R=11), and Bit Rate. As many sets of Data ID, U (K=00, M=01, G=10, R=11), and Bit Rate as a number indicated by a Number Of Data ID are stored.

A Network Model ID is an identifier of a network model.

A Command ID is an identifier specifying a control command.

A Number Of Data ID indicates the number of Data IDs. The number of pieces of transmission data to be subjected to transmission rate control is indicated by the Number Of Data ID.

A Data ID is an identifier of transmission data. A type of the transmission data to be subjected to transmission rate control is indicated by the Data ID.

U (K=00, M=01, G=10, R=11) indicates a unit of the transmission rate (Bit Rate). Any of units of Kbps, Mbps, and Gbps is indicated by U (K=00, M=01, G=10, R=11). It is to be noted that R=11 is reserved as Reserve.

A Bit Rate indicates a value of the bit rate.

As a control command having the format described above, for example, the following three types of control commands are defined.

1. A control command regarding network model control
2. A control command regarding transmission rate control
3. A control command requesting transmission rate control in accordance with a change amount of transmission data The first control command, i.e., the control command regarding network model control is used, for example, for purpose of switching a network model. As a format of the control command regarding network model control, for example, the format illustrated in FIG. 8 is used. A Network Model ID indicates a switched network model.

The control command regarding network model control is used, for example, when the inference terminal 3 performing inference processing instructs the cloud terminal 2 to switch the network model used in the inference processing. The switching of the network model used in the inference processing is performed, for example, when the occurrence of variation in the transmission band has been detected by the inference terminal 3.

Hereinafter, the control command regarding network model control is referred to as a network model change command as appropriate.

The second control command, i.e., the control command regarding transmission rate control is used, for example, for purpose of controlling the transmission rate. As a format of the control command regarding transmission rate control, for example, the format illustrated in FIG. 10 is used. With respect to each of pieces of transmission data to be subjected to transmission rate control, as many sets of Data ID, U (K=00, M=01, G=10, R=11), and Bit Rate as a number indicated by a Number Of Data ID are stored.

The control command regarding transmission rate control is used, for example, when the inference terminal 3 performing inference processing instructs the cloud terminal 2 to change the transmission rate of each piece of transmission data used in the inference processing. The change of the transmission rate is made, for example, when the occurrence of variation in the transmission band has been detected by the inference terminal 3.

Hereinafter, the control command regarding transmission rate control is referred to as a transmission rate change command as appropriate.

The third control command, i.e., the control command requesting transmission rate control in accordance with a change amount of transmission data is used for purpose of adjusting the transmission rate in accordance with a change amount of transmission data. As a format of the control command requesting transmission rate control in accordance with a change amount of transmission data, for example, the format illustrated in FIG. 8 is used.

The control command requesting transmission rate control in accordance with a change amount of transmission data is used, for example, when the inference terminal 3 performing inference processing instructs the cloud terminal 2 to adjust the transmission rate of each piece of transmission data used in the inference processing in accordance with an amount of change. The adjustment of the transmission rate is performed, for example, when the occurrence of variation in the transmission band has been detected by the inference terminal 3.

Hereinafter, the control command requesting transmission rate control in accordance with a change amount of transmission data is referred to as a transmission rate adjustment requesting command as appropriate.

In this way, the RTP/RTCP format is defined and used for data transmission and its control, which makes it possible to cause learning of a network model and inference using the network model to be performed as real-time processing.

The inference terminal 3 is able to perform inference processing continuously while maintaining constant accuracy even in an environment where the state of data transmission varies.

Since TCP (RFC793) is a protocol to internally execute retransmission and rate control, in a case where data used for machine learning is transmitted by means of TCP, it is difficult to recognize the state of the data transmission from an upper layer, such as an application. Therefore, it is difficult to cause the application of the upper layer to perform real-time transmission control, such as controlling the transmission rate or controlling retransmission, in accordance with the state of a transmission path; however, by using the RTP/RTCP as described above, it becomes possible to easily perform such control.

A series of processing using the above-described control commands to control data transmission will be described later with reference to flowcharts.

3. CONFIGURATION EXAMPLE OF EACH DEVICE

Here, a configuration of each device is described.

<Configuration of Upload Terminal 1>

FIG. 12 is a block diagram illustrating a hardware configuration example of the upload terminal 1.

A central processing unit (CPU) 11, a read-only memory (ROM) 12, and a random access memory (RAM) 13 are coupled to one another by a bus 14.

A camera 15, a mic 16, and a sensor 17 are coupled to the bus 14. The camera 15 takes an image of surroundings. The mic 16 detects an ambient sound. The sensor 17 includes the above-described various sensors, such as the acceleration sensor, the angular velocity sensor, and the positioning sensor. The sensor 17 outputs information indicating a detection result.

The upload terminal 1 does not have to be provided with all of the camera 15, the mic 16, and the sensors included in the sensor 17; a combination of the sensors provided in the upload terminal 1 may be changed optionally.

Furthermore, a storage section 18 and a communication section 19 are also coupled to the bus 14. The storage section 18 includes a non-volatile memory, etc. The storage section 18 stores therein a variety of data such as sensor data besides a program executed by the CPU 11.

The communication section 19 includes a network interface, etc., and is coupled to the network 4 through wireless or wired communication to perform communication with the cloud terminal 2. The communication section 19 includes a transmitter 19A and a receiver 19B. The transmitter 19A transmits an RTP packet having a format like the one described with reference to FIG. 6 to the cloud terminal 2. The receiver 19B receives, for example, an RTCP packet storing therein a transmission rate change command transmitted from the cloud terminal 2.

FIG. 13 is a block diagram illustrating a functional configuration example of the upload terminal 1. At least some of functional sections illustrated in FIG. 13 are realized by a predetermined program being executed by the CPU 11 illustrated in FIG. 12.

As illustrated in FIG. 13, in the upload terminal 1, a control manager 31 and a transmission processing section 32 are realized. The transmission processing section 32 includes a transmission manager 41, a transmission database 42, and an RTP/RTCP packetizer 43.

The control manager 31 exchanges a variety of information with the transmission manager 41 of the transmission processing section 32, and controls the entire operation of the upload terminal 1.

The transmission manager 41 of the transmission processing section 32 controls data transmission to the cloud terminal 2 and reception of data transmitted from the cloud terminal 2.

The transmission database 42 stores therein a variety of setting information regarding data transmission, such as the transmission rate.

The RTP/RTCP packetizer 43 generates an RTP packet storing therein transmission data. The RTP/RTCP packetizer 43 serves as a generator that generates an RTP packet having the format illustrated in FIG. 6. The RTP packet generated by the RTP/RTCP packetizer 43 is supplied to the transmitter 19A, and is transmitted to the cloud terminal 2.

Furthermore, the RTP/RTCP packetizer 43 analyzes an RTCP packet that has been transmitted from the cloud terminal 2 and received by the receiver 19B, and acquires a control command stored in a payload.

<Configuration of Cloud Terminal 2 and Inference Terminal 3>

FIG. 14 is a block diagram illustrating a hardware configuration example of the cloud terminal 2.

A CPU 101, a ROM 102, and a RAM 103 are coupled to one another by a bus 104. Further, an input-output interface 105 is coupled to the bus 104.

An input section 106 including a mouse, a keyboard, etc. and an output section 107 including a display, a speaker, etc. are coupled to the input-output interface 105. Furthermore, a storage section 108, a communication section 109, and a drive 110 are also coupled to the input-output interface 105.

The storage section 108 includes a hard disk, a non-volatile memory, etc., and stores therein a network model generated by learning processing.

The communication section 109 includes a network interface, etc., and is coupled to the network 4 through wireless or wired communication to perform communication with the upload terminal 1 and the inference terminal 3. The communication section 109 includes a transmitter 109A and a receiver 109B.

At the time of inference using a network model, the transmitter 109A transmits an RTP packet transmitted from the upload terminal 1 to the inference terminal 3. The receiver 109B receives an RTP packet transmitted from the upload terminal 1. Furthermore, the receiver 109B receives an RTCP packet transmitted from the inference terminal 3.

The drive 110 drives a removal medium 111, and reads out data stored in the removal medium 111 or writes data on the removal medium 111.

The inference terminal 3 also has the same configuration as the configuration illustrated in FIG. 14. In the following, the configuration of the cloud terminal 2 illustrated in FIG. 14 is referred to and described as the configuration of the inference terminal 3 as appropriate.

It is to be noted that in this example, the cloud terminal 2 is realized on one device; however, it is able to be realized by multiple devices. That is, it is possible to adopt, as a configuration of the cloud terminal 2, a configuration of cloud computing that realizes the functions of the cloud terminal 2 by sharing them in cooperation among multiple devices coupled through the network 4. Much the same is true for the inference terminal 3.

FIG. 15 is a block diagram illustrating a functional configuration example of the cloud terminal 2. At least some of functional sections illustrated in FIG. 15 are realized by a predetermined program being executed by the CPU 101 illustrated in FIG. 14.

As illustrated in FIG. 15, in the cloud terminal 2, a control manager 131, a machine learning processing section 132, and a transmission processing section 133 are realized. The machine learning processing section 132 includes a machine learning manager 141, a machine learning database 142, and a machine learning engine 143. The transmission processing section 133 includes a transmission manager 151, a transmission database 152, and an RTP/RTCP packetizer 153.

The control manager 131 exchanges a variety of information with the machine learning manager 141 and the transmission manager 151, and controls the entire operation of the cloud terminal 2.

The machine learning manager 141 of the machine learning processing section 132 controls processing associated with machine learning.

The machine learning database 142 stores therein a variety of information regarding machine learning, such as setting information for machine learning and a network model generated by machine learning.

At the time of network model learning, the machine learning engine 143 performs learning processing on the basis of transmission data transmitted from the upload terminal 1 and generates a network model.

The transmission manager 151 of the transmission processing section 133 controls data transmission to the inference terminal 3 and reception of data transmitted from the upload terminal 1.

The transmission database 152 stores therein a variety of setting information regarding data transmission, such as the transmission rate.

The RTP/RTCP packetizer 153 analyzes an RTP packet transmitted from the upload terminal 1, and supplies the RTP packet to the transmitter 109A to cause the transmitter 109A to transmit the RTP packet to the inference terminal 3. Furthermore, the RTP/RTCP packetizer 153 analyzes an RTCP packet that has been transmitted from the inference terminal 3 and received by the receiver 109B, and acquires a control command stored in a payload.

FIG. 16 is a block diagram illustrating a functional configuration example of the inference terminal 3. At least some of functional sections illustrated in FIG. 16 are realized by a predetermined program being executed by the CPU 101 illustrated in FIG. 14 that is included in the inference terminal 3.

As illustrated in FIG. 16, in the inference terminal 3, a control manager 171, an inference processing section 172, and a transmission processing section 173 are realized. The inference processing section 172 includes an inference manager 181, an inference database 182, and an inference engine 183. The transmission processing section 173 includes a transmission manager 191, a transmission database 192, and an RTP/RTCP packetizer 193.

The control manager 171 exchanges a variety of information with the inference manager 181 and the transmission manager 191, and controls the entire operation of the inference terminal 3.

The inference manager 181 of the inference processing section 172 grasps the state, etc. of inference processing using a network model, and controls the inference processing.

The inference database 182 stores therein a variety of information regarding inference, such as setting information for inference. A network model set 182A supplied from the cloud terminal 2 is stored in the inference database 182. For example, network models included in the network model set 182A are updated each time learning by the cloud terminal 2 is performed.

At the time of inference, the inference engine 183 performs inference processing using transmission data transmitted from the upload terminal 1 via the cloud terminal 2 as an input of a network model.

The transmission manager 191 of the transmission processing section 173 controls data transmission to the cloud terminal 2 and reception of data transmitted from the cloud terminal 2.

The transmission database 192 stores therein a variety of setting information regarding data transmission, such as the transmission rate.

The RTP/RTCP packetizer 193 analyzes an RTP packet transmitted from the upload terminal 1 via the cloud terminal 2, and acquires transmission data. Furthermore, the RTP/RTCP packetizer 193 generates an RTCP packet storing therein a control command, and transmits the RTCP packet to the cloud terminal 2.

4. OPERATION OF TRANSMISSION SYSTEM

Here, the operation of each device having the configuration described above is described.
<Basic Processing>
First, preprocessing performed between the upload terminal 1 and the cloud terminal 2 before data transmission is started is described with reference to a flowchart of FIG. 17. Through the preprocessing, information regarding the upload terminal 1, such as data that is able to be transmitted, is registered in the cloud terminal 2.

At Step S1, the control manager 31 of the upload terminal 1 controls the communication section 19 to access the cloud terminal 2, and transmits an information registration start request. The information registration start request is information requesting to start a process of registering information regarding the upload terminal 1.

It is to be noted that a request transmitted and received between devices is information indicating a request made by one of the devices to the other device, and a response is information indicating a response made by the other device to the one device. Much the same is true in not only FIG. 17 but also flowcharts of FIG. 18 and subsequent drawings described later.

At Step S11, the control manager 131 of the cloud terminal 2 receives the information registration start request transmitted from the upload terminal 1. At Step S12, the control manager 131 transmits an information registration start response to the upload terminal 1.

At Step S2, the control manager 31 of the upload terminal 1 receives the information registration start response transmitted from the cloud terminal 2. At Step S3, the control manager 31 transmits an information registration request to the cloud terminal 2. The information registration request transmitted here includes information of coupling to the upload terminal 1, and information such as a Data ID indicating a type of data that the upload terminal 1 is able to transmit.

At Step S13, the control manager 131 of the cloud terminal 2 receives the information registration request transmitted from the upload terminal 1. At Step S14, the control manager 131 outputs the information indicating the type of data that the upload terminal 1 is able to transmit included in the information registration request to the machine learning processing section 132, and causes the machine learning processing section 132 to store the information in the machine learning database 142. Furthermore, the control manager 131 outputs the information of coupling to the upload terminal 1 included in the information registration request to the transmission processing section 133, and causes the transmission processing section 133 to store the information in the transmission database 152.

After the information regarding the upload terminal 1 has been stored, at Step S15, the control manager 131 transmits an information registration response to the upload terminal 1. The information registration response is information notifying that the information regarding the upload terminal 1 has been stored.

At Step S4, the control manager 31 of the upload terminal 1 receives the information registration response transmitted from the cloud terminal 2. At Step S5, the control manager 31 transmits an information registration end request to the cloud terminal 2.

At Step S16, the control manager 131 of the cloud terminal 2 receives the information registration end request transmitted from the upload terminal 1. At Step S17, the control manager 131 transmits an information registration end response to the upload terminal 1.

At Step S6, the control manager 31 of the upload terminal 1 receives the information registration end response transmitted from the cloud terminal 2, and ends the preprocessing.

The above processing is performed between each upload terminal 1 and the cloud terminal 2. Information regarding data that each upload terminal 1 is able to transmit is registered in the cloud terminal 2.

Subsequently, signaling processing performed between the cloud terminal 2 and the inference terminal 3 is described with reference to a flowchart of FIG. 18. The signaling processing is performed after the preprocessing illustrated in FIG. 17 has been performed between the upload terminal 1 and the cloud terminal 2.

At Step S31, the control manager 171 of the inference terminal 3 transmits a signaling start request to the cloud terminal 2.

At Step S51, the control manager 131 of the cloud terminal 2 receives the signaling start request transmitted from the inference terminal 3. At Step S52, the control manager 131 transmits a signaling start response to the upload terminal 1.

At Step S32, the control manager 171 of the inference terminal 3 receives the signaling start response transmitted from the cloud terminal 2. At Step S33, the control manager 171 transmits a transmission information acquisition request to the cloud terminal 2.

At Step S53, the control manager 131 of the cloud terminal 2 receives the transmission information acquisition request transmitted from the upload terminal 1. At Step S54, the control manager 131 transmits a transmission information acquisition response to the inference terminal 3. The transmission information acquisition response transmitted here includes a list of network models that the cloud terminal 2 is able to handle. A network model that the cloud terminal 2 itself has generated by performing learning processing and has stored in the machine learning database 142 is the network model that the cloud terminal 2 is able to handle.

At Step S34, the control manager 171 of the inference terminal 3 receives the transmission information acquisition response transmitted from the cloud terminal 2. At Step S35, the control manager 171 checks the list of network models included in the transmission information acquisition response and a list of network models stored in the inference database 182, and determines a network model used in inference processing.

For example, of the network models stored in the inference database 182, the same network model as the network model that the cloud terminal 2 is able to handle is determined to be a network model used in inference processing. That the cloud terminal 2 is able to handle the network model means that the cloud terminal 2 is able to acquire transmission data of a type used for learning of the network model from the upload terminal 1 and transmit the transmission data to the inference terminal 3.

The determination of the network model performed at Step S35 is a process of identifying a type of transmission data that the cloud terminal 2 is able to transmit and determining a network model that makes it possible to perform inference processing using the transmission data. For example, in a case where it has been identified that the cloud terminal 2 is able to transmit three types of data of the temperature, the humidity, and the wind force, the above-described weather forecast model is determined to be a network model used in inference processing.

At Step S36, the control manager 171 determines a transmission rate of each piece of the transmission data to be an input of the network model determined to be used in the inference processing.

At Step S37, the control manager 171 transmits a transmission information setup request to the cloud terminal 2. The transmission information setup request transmitted here includes information of the network model determined to be used in the inference processing and information of the transmission rate of each piece of the transmission data used as an input of the inference processing.

At Step S55, the control manager 131 of the cloud terminal 2 receives the transmission information setup request transmitted from the inference terminal 3. At Step S56, the control manager 131 outputs the information of the network model determined to be used in the inference processing included in the transmission information setup request to the machine learning processing section 132, and causes the machine learning processing section 132 to store the information in the machine learning database 142. Furthermore, the control manager 131 outputs the information of the transmission rate of each piece of the transmission data included in the transmission information setup request to the transmission processing section 133, and causes the transmission processing section 133 to store the information in the transmission database 152.

After the information regarding the inference processing has been stored, at Step S57, the control manager 131 transmits a transmission information setup response to the inference terminal 3. The transmission information setup response is information notifying that the information regarding the inference processing has been stored.

At Step S38, the control manager 171 of the inference terminal 3 receives the transmission information setup response transmitted from the cloud terminal 2. At Step S39, the control manager 171 transmits a signaling end request to the cloud terminal 2.

At Step S58, the control manager 131 of the cloud terminal 2 receives the signaling end request transmitted from the inference terminal 3. At Step S59, the control manager 131 transmits a signaling end response to the inference terminal 3.

At Step S40, the control manager 171 of the inference terminal 3 receives the signaling end response transmitted from the cloud terminal 2, and ends the signaling processing.

Subsequently, rate control processing performed between the upload terminal 1 and the cloud terminal 2 is described with reference to a flowchart of FIG. 19. The rate control processing is performed after the signaling processing illustrated in FIG. 18 has been performed between the cloud terminal 2 and the inference terminal 3.

At Step S71, the control manager 131 of the cloud terminal 2 transmits a transmission rate control start request to the upload terminal 1.

At Step S81, the control manager 31 of the upload terminal 1 receives the transmission rate control start request transmitted from the cloud terminal 2. At Step S82, the control manager 31 transmits a transmission rate control start response to the cloud terminal 2.

At Step S72, the control manager 131 of the cloud terminal 2 receives the transmission rate control start response transmitted from the upload terminal 1. At Step S73, the control manager 131 transmits a transmission rate setup request to the upload terminal 1. The transmission rate setup request transmitted here includes the information of the transmission rate of each piece of the transmission data that has been determined by the inference terminal 3.

At Step S83, the control manager 31 of the upload terminal 1 receives the transmission rate setup request transmitted from the cloud terminal 2. At Step S84, the control manager 31 outputs the information of the transmission rate of each piece of the transmission data included in the transmission rate setup request to the transmission processing section 32, and causes the transmission processing section 32 to store the information in the transmission database 42.

After the information regarding the transmission rate has been stored, at Step S85, the control manager 31 transmits a transmission rate setup response to the cloud terminal 2. The transmission rate setup response is information notifying that the information regarding the transmission rate has been stored.

At Step S74, the control manager 131 of the cloud terminal 2 receives the transmission rate setup response transmitted from the upload terminal 1. At Step S75, the control manager 131 transmits a transmission rate control end request to the upload terminal 1.

At Step S86, the control manager 31 of the upload terminal 1 receives the transmission rate control end request transmitted from the cloud terminal 2. At Step S87, the control manager 31 transmits a transmission rate control end response to the cloud terminal 2.

At Step S76, the control manager 131 of the cloud terminal 2 receives the transmission rate control end response transmitted from the upload terminal 1, and ends the rate control processing.

Through the above-described series of processing, the upload terminal 1 becomes able to transmit transmission data used as an input of inference processing in accordance with a transmission rate determined by the inference terminal 3. Furthermore, the inference terminal 3 becomes able to receive the transmission data transmitted from the upload terminal 1 via the cloud terminal 2 and perform inference processing using the transmission data as an input of the network model.

Subsequently, data transmission processing at the time of inference processing is described with reference to a flowchart of FIG. 20. At the time of inference processing, the processing illustrated in FIG. 20 is repeatedly performed by the upload terminal 1, the cloud terminal 2, and the inference terminal 3.

At Step S101, the control manager 31 of the upload terminal 1 controls the camera 15, the mic 16, and the sensor 17, and causes them to detect sensor data. Data of an image taken by the camera 15 and data of a sound collected by the mic 16 are also acquired as sensor data as appropriate.

At Step S102, the RTP/RTCP packetizer 43 of the transmission processing section 32 generates an RTP packet having the format illustrated in FIG. 6 in which sensor data used as an input of inference processing has been stored. In a case where a network model that becomes an input destination of transmission data transmitted by the upload terminal 1 is a network model using multiple types of sensor data as inputs, an RTP packet storing therein the multiple types of sensor data all together is generated.

At Step S103, the transmission manager 41 transmits the RTP packet to the cloud terminal 2. The transmission of the RTP packet is performed in accordance with the transmission rate set in the rate control processing illustrated in FIG. 19.

At Step S111, the transmission manager 151 of the cloud terminal 2 receives the RTP packet transmitted from the upload terminal 1.

At Step S112, the RTP/RTCP packetizer 153 analyzes the RTP packet. For example, a transmission destination of transmission data is identified to be the inference terminal 3 on the basis of a Network Model ID stored in the RTP packet.

At Step S113, the transmission manager 151 transmits the RTP packet transmitted from the upload terminal 1 to the inference terminal 3.

At Step S121, the transmission manager 191 of the inference terminal 3 receives the RTP packet transmitted from the cloud terminal 2.

At Step S122, the RTP/RTCP packetizer 193 analyzes the RTP packet. The transmission data stored in the RTP packet is supplied together with information of the Network Model ID, etc. to the inference processing section 172.

At Step S123, the inference engine 183 performs inference processing based on a network model identified by the Network Model ID using the transmission data. In the inference processing, the transmission data is used as an input of the network model, and a predetermined inference result is found. Information of the inference result is used in various processing by the control manager 171.

It is to be noted that in the cloud terminal 2, as illustrated at Step S114, it is possible to appropriately perform learning processing using the transmission data stored in the RTP packet transmitted from the upload terminal 1 in parallel with the inference processing by the inference terminal 3.

In this way, transmission data transmitted from the upload terminal 1 at the time of inference processing is not only used as an input of inference using a network model, but it is also used for network model learning by machine learning.

<Network Model Switching Processing>

Subsequently, network model switching processing performed between the cloud terminal 2 and the inference terminal 3 is described with reference to a flowchart of FIG. 21.

While the transmission and reception of transmission data is performed between the cloud terminal 2 and the inference terminal 3, and the inference processing is performed by the inference terminal 3 by the processing illustrated in FIG. 20, a downlink transmission band changes. If a data communication link in a direction from the inference terminal 3 to the cloud terminal 2 is an uplink, a downlink is a data communication link in a direction from the cloud terminal 2 to the inference terminal 3.

The processing illustrated in FIG. 21 is processing to switch the network model the inference terminal 3 uses in inference processing to a network model that allows for inference processing using data which is able to be transmitted and received within a band allowed to be allocated.

At Step S151, the control manager 171 of the inference terminal 3 detects variation in the transmission band on the basis of information acquired from the inference manager 181 and the transmission manager 191.

For example, in a case where it has been detected that a difference between the throughput in inference processing and the transmission rate (the throughput) in data transmission is equal to or more than a threshold, it is detected that there is variation in the transmission band. The throughput in inference processing is identified on the basis of the information acquired from the inference manager 181, and the transmission rate is identified on the basis of the information acquired from the transmission manager 191.

Specifically, if the throughput in inference processing is 100 Mbps (if 100 Mbit of transmission data per second is desired as an input of inference processing), to continue the inference processing, 100 Mbps or more is desired as a transmission rate in data transmission. In a case where the allocated transmission rate of 100 Mbps or more has become 50 Mbps, there is insufficient data for inference processing.

For example, in a case where such a large difference arises, it is detected that there is variation in the transmission band.

In a case where it is detected that there is variation in the transmission band, at Step S152, to select a network model appropriate for the transmission rate, the control manager 171 makes an inquiry to the inference manager 181 about a network model. The inference manager 181 is supplied with information indicating the inquiry about a network model and information of the transmission rate of each piece of the transmission data.

At Step S161, the inference manager 181 receives the inquiry from the control manager 171.

At Step S162, the inference manager 181 determines an optimal network model with reference to information stored in the inference database 182. For example, the inference manager 181 determines a network model meeting a condition of the following Expression (1) to be an optimal network model.

[Math. 1]

$$\text{amount of data desired for one inference processing} \times \text{number of times processing within unit time [s]} < \text{transmission rate [bps] at time of data reception} \times \text{unit time [s]} \quad (1)$$

In this way, a network model meeting a condition of lower throughput than the current transmission rate is determined to be an optimal network model.

At Step S163, the inference manager 181 notifies the control manager 171 of the determined network model.

At Step S153, to notify of the change of the network model, the control manager 171 requests the transmission manager 191 to transmit a network model change command to the cloud terminal 2. The transmission manager 191 is supplied with information that instructs to transmit a network model change command and information indicating the switched network model determined by the inference manager 181.

At Step S171, the transmission manager 191 receives the request from the control manager 171.

At Step S172, the RTP/RTCP packetizer 193 generates an RTCP packet storing therein the network model change command having the format illustrated in FIG. 8 in accordance with control by the transmission manager 191. Network Model ID in the network model change command includes an identifier indicating the switched network model.

At Step S173, the transmission manager 191 transmits the RTCP packet generated by the RTP/RTCP packetizer 193 to the cloud terminal 2.

At Step S201, the transmission manager 151 of the cloud terminal 2 receives the RTCP packet transmitted from the inference terminal 3.

At Step S202, the RTP/RTCP packetizer 153 acquires the network model change command by analyzing the RTCP packet, and outputs the network model change command to the control manager 131.

At Step S221, the control manager 131 receives the network model change command supplied from the RTP/RTCP packetizer 153.

At Step S222, the control manager 131 requests the machine learning manager 141 to change the network model. Information indicating the request for change of the network model and a Network Model ID indicating the switched network model are outputted to the machine learning manager 141.

At Step S211, the machine learning manager 141 receives the request from the control manager 131.

At Step S212, the machine learning manager 141 refers to associated information of the network model and transmission data stored in the machine learning database 142, and changes transmission data to be transmitted to the inference terminal 3 in accordance with the change of the network model. For example, information such as a Data ID indicating a type of the changed transmission data is registered in the machine learning database 142.

At Step S213, the machine learning manager 141 notifies the control manager 131 that the transmission data has been changed.

At Step S223, the control manager 131 receives the notification from the machine learning manager 141, and ends the processing. Transmission of the transmission data to the inference terminal 3 is continued in accordance with the changed setting.

Meanwhile, in the inference terminal 3, whether or not the transmission data used as an input of the switched network model matches the transmission data stored in the RTP packet is checked on the basis of the transmission data transmitted from the cloud terminal 2.

In a case where it has been confirmed that the transmission data used as an input of the switched network model matches the transmission data stored in the RTP packet, at Step S155, the control manager 171 requests the inference manager 181 to change the network model. Information indicating the request for change of the network model and information such as a Network Model ID indicating the changed network model are outputted to the inference manager 181.

At Step S164, the inference manager 181 receives the request from the control manager 171.

At Step S165, the inference manager 181 changes the network model by selecting the changed network model from the network model set 182A and replacing the network model set in the inference engine 183 with the selected one.

At Step S166, the inference manager 181 notifies the control manager 171 that the network model has been changed. After that, the inference processing is continued with use of the changed network model.

In this way, even in a situation where the downlink transmission band varies, and there is insufficient data for inference processing, by transmitting a network model change command using an RTCP packet, it becomes possible to easily deal with such variation.

In the above, there is described the processing in a case where the transmission rate has dropped, and there is insufficient data for inference processing; however, much the same is true in a case where the transmission band has been restored, and the transmission rate has increased.

For example, in a case where measurements of the packet loss rate and the round trip time are made during data transmission, and the packet loss rate and the round trip time are lower than respective thresholds, and the transmission band has a margin, it is determined that transmission of more data is possible.

In a case where the transmission band has a margin, a network model desiring more data than the current network model is selected by the inference manager 181, and is set in the inference engine 183. Accordingly, when the transmission band has been restored, using the changed network model makes it possible to improve the accuracy of inference processing.

By causing processing in a case where the transmission rate has dropped and processing in a case where the transmission rate has been restored to be performed during inference processing, it becomes possible to select a network model in accordance with variation in the transmission rate and continue the inference processing.

<Transmission Rate Control Processing in Accordance with Variation in Transmission Band>

Subsequently, transmission rate control processing performed between the cloud terminal 2 and the inference terminal 3 is described with reference to a flowchart of FIG. 22.

The processing illustrated in FIG. 22 is also initiated in a case where the transmission and reception of transmission data is performed between the cloud terminal 2 and the inference terminal 3, and inference processing is performed by the inference terminal 3. The processing illustrated in FIG. 22 is processing that the inference terminal 3 requests the cloud terminal 2 to adjust the transmission rate in accordance with variation in the downlink transmission band.

At Step S251, the control manager 171 of the inference terminal 3 detects variation in the transmission band on the basis of information acquired from the inference manager 181 and the transmission manager 191. This process is a process similar to the process at Step S151 in FIG. 21.

In a case where it has been detected that there is variation in the transmission band, at Step S252, the control manager 171 requests the inference manager 181 to change a transmission rate of a specific type of transmission data in accordance with the current transmission rate. Information indicating the request for change of the transmission rate and information of the transmission rate of each piece of transmission data are outputted to the inference manager 181.

At Step S261, the inference manager 181 receives the request from the control manager 171.

At Step S262, the inference manager 181 determines the transmission rate of the specific type of transmission data on the basis of the information of the transmission rate of each piece of transmission data. For example, the inference manager 181 selects transmission data having a low impact on an inference result as a specific type of transmission rate. Furthermore, the inference manager 181 determines the transmission rate of each piece of transmission data to cause the transmission rate of the specific type of transmission data to be reduced and cause the sum of respective transmission rates of all pieces of transmission data to meet the condition of the above-described Expression (1).

For example, assume that inference processing is performed using three types of data of the temperature, the humidity, and the wind force as inputs of the above-described weather forecast model. In a case where a change of the weather greatly affects two factors of the temperature and the humidity, the wind force is selected as low-impact data, and the transmission rate is determined to cause the transmission rate of the wind force to be reduced. Accordingly, it is possible to continue the weather forecast even if the accuracy of inference processing, i.e., a result of the weather forecast is degraded to some extent.

At Step S263, as for the specific type of transmission data expected to become insufficient for inference processing due to the change of the transmission rate, the inference manager 181 makes the setting directed to saving past data, such as data used in the previous processing (the previous inference processing).

At Step S264, the inference manager 181 notifies the control manager 171 of the transmission rate of each piece of transmission data.

At Step S253, the control manager 171 receives the notification from the inference manager 181.

At Step S254, to request the change of the transmission rate of the specific type of transmission data, the control manager 171 requests the transmission manager 191 to transmit a transmission rate change command to the cloud terminal 2. Information that instructs to transmit a transmission rate change command and information indicating the changed transmission rate determined by the inference manager 181 are outputted to the transmission manager 191.

At Step S271, the transmission manager 191 receives the request from the control manager 171.

At Step S272, the RTP/RTCP packetizer 193 generates an RTCP packet storing therein the transmission rate change command having the format illustrated in FIG. 10 in accordance with control by the transmission manager 191. The transmission rate change command includes an identifier of the specific type of transmission data whose transmission rate is to be changed and information of the transmission rate.

At Step S273, the transmission manager 191 transmits the RTCP packet generated by the RTP/RTCP packetizer 193 to the cloud terminal 2.

At Step S301, the transmission manager 151 of the cloud terminal 2 receives the RTCP packet transmitted from the inference terminal 3.

At Step S302, the RTP/RTCP packetizer 153 acquires the transmission rate change command by analyzing the RTCP packet, and outputs the transmission rate change command to the control manager 131.

At Step S321, the control manager 131 receives the transmission rate change command supplied from the RTP/RTCP packetizer 153.

At Step S322, the control manager 131 requests the transmission manager 151 to change the transmission rate of the specific type of transmission data. Information indicating the changed transmission rate is outputted to the transmission manager 151.

At Step S303, the transmission manager 151 receives the request from the control manager 131.

At Step S304, the transmission manager 151 changes information of the transmission rate of each piece of transmission data stored in the transmission database 152.

At Step S305, the transmission manager 151 notifies the control manager 131 that the transmission rate has been changed.

At Step S323, the control manager 131 receives the notification from the transmission manager 151, and ends the processing. Subsequent transmission of the transmission data is performed in accordance with the changed transmission rate.

In this way, even in a situation where the downlink transmission band varies and the transmission band becomes insufficient, by transmitting a transmission rate change command using an RTCP packet, it becomes possible to easily deal with such variation.

Furthermore, as described above, in the inference terminal 3, as for a specific type of data expected to become insufficient for inference processing due to the change of the transmission rate, past data, such as the previous data, is saved.

In a case of the example using the above-described weather forecast model, data of the wind force is saved. In the inference processing, at a certain timing after the change of the transmission rate, inference processing is performed using transmitted data of the temperature and the humidity and the saved data of the wind force as inputs of the weather forecast model.

In this way, the inference terminal 3 performs inference processing using saved data; therefore, even in a case where the transmission rate is changed, it is possible to continue the inference processing.

<Transmission Control Processing in Accordance with Change Amount of Data>

Subsequently, transmission control processing performed between the cloud terminal 2 and the inference terminal 3 is described with reference to a flowchart of FIG. 23.

The processing illustrated in FIG. 23 is also initiated in a case where the transmission and reception of transmission data is performed between the cloud terminal 2 and the inference terminal 3, and inference processing is performed by the inference terminal 3. The processing illustrated in FIG. 23 is processing that the inference terminal 3 requests the cloud terminal 2 to adjust the transmission rate to cause only transmission data having a large change amount to be transmitted in accordance with variation in the downlink transmission band.

At Step S351, the control manager 171 of the inference terminal 3 detects variation in the transmission band on the basis of information acquired from the inference manager 181 and the transmission manager 191. This process is a process similar to the process at Step S151 in FIG. 21, etc.

In a case where it has been detected that there is variation in the transmission band, at Step S352, the control manager 171 requests the inference manager 181 to save past data, such as the previous data, of all pieces of transmission data. In the processing illustrated in FIG. 23, an adjustment of which type of transmission data is transmitted at which degree of transmission rate is made by the cloud terminal 2; therefore, all types of transmission data are saved here. The inference processing after the adjustment of the transmission rate is appropriately performed using transmission data transmitted from the cloud terminal 2 and the saved transmission data.

At Step S361, the inference manager 181 receives the request from the control manager 171.

At Step S362, the inference manager 181 makes the setting directed to saving past data of all types of transmission data.

At Step S363, the inference manager 181 notifies the control manager 171 that the setting directed to saving past data has been made.

At Step S353, the control manager 171 receives the notification from the inference manager 181.

At Step S354, to request data transmission in accordance with a change amount of data, the control manager 171 requests the transmission manager 191 to transmit a transmission rate adjustment requesting command to the cloud terminal 2.

At Step S371, the transmission manager 191 receives the request from the control manager 171.

At Step S372, the RTP/RTCP packetizer 193 generates an RTCP packet storing therein the transmission rate adjustment requesting command having the format illustrated in FIG. 8 in accordance with control by the transmission manager 191. Network Model ID in the transmission rate adjustment requesting command includes an identifier indicating a network model.

At Step S373, the transmission manager 191 transmits the RTCP packet generated by the RTP/RTCP packetizer 193 to the cloud terminal 2.

At Step S401, the transmission manager 151 of the cloud terminal 2 receives the RTCP packet transmitted from the inference terminal 3.

At Step S402, the RTP/RTCP packetizer 153 acquires the transmission rate adjustment requesting command by analyzing the RTCP packet, and outputs the transmission rate adjustment requesting command to the control manager 131.

At Step S421, the control manager 131 receives the transmission rate adjustment requesting command transmitted from the RTP/RTCP packetizer 153.

At Step S422, the control manager 131 requests the machine learning manager 141 to adjust the transmission rate of each piece of transmission data in accordance with a change amount of data.

At Step S411, the machine learning manager 141 receives the request from the control manager 131.

At Step S412, the machine learning manager 141 calculates a threshold of the change amount of data (a measured value), and saves information of the threshold found by the calculation in the machine learning database 142. The threshold saved here is a threshold that serves as a criterion in selecting a type of transmission data to be transmitted to the inference terminal 3. Only a type of transmission data having a change amount exceeding the threshold is transmitted to the inference terminal 3.

That is, a type of transmission data having a small change amount is considered to have a low impact on an inference result even if the inference terminal 3 performs inference processing using the saved data. By transmitting only a type of transmission data that has a change amount larger than the threshold and is considered to have a high impact on an inference result, it becomes possible to increase the accuracy of inference processing efficiently using the limited transmission band.

As for a type of transmission data meeting, for example, a condition of the following Expression (2), the machine learning manager 141 determines that it is data having a low impact on an inference result, and does not transmit the type of transmission data to the inference terminal 3.

[Math. 2]

$$\text{threshold of change amount of data} > |\text{transmitted latest data} - \text{current data}| \quad (2)$$

As for the threshold of the change amount, for example, with respect to each type of transmission data, a value determined in advance in accordance with a tendency of change is used. The threshold once set may be updated to an appropriate value in accordance with variation in the transmission band as appropriate.

At Step S413, the machine learning manager 141 notifies the control manager 131 that the threshold of the change amount has been saved.

At Step S423, the control manager 131 receives the notification from the machine learning manager 141, and ends the processing. Subsequent transmission of the transmission data is performed to cause only a type of transmission data having a change amount exceeding the threshold to be transmitted in accordance with the threshold set by the machine learning manager 141.

As for a method of determining the change amount of data and adjustment of a variety of transmission data, the following methods may be used apart from the method indicated by Expression (2).

With respect to each piece of transmission data, the machine learning manager 141 calculates variance (dispersion) per unit time, such as in 10 seconds. Here, respective variance of pieces of data A to C that are transmission data are denoted by X, Y, and Z as described below.

Variance of data A: X
Variance of data B: Y
Variance of data C: Z

The machine learning manager 141 adds up the respective variance of the pieces of data A to C, and finds a total value SUM.

[Math. 3]
$$X+Y+Z=\text{SUM} \tag{3}$$

The machine learning manager 141 determines respective percentage of the transmission amount (the transmission rate) of the pieces of data A to C on the basis of the total value SUM as indicated by the following Expressions (4) to (6). A higher transmission rate is allocated to data having higher variance.

[Math. 4]
$$X/\text{SUM}=\text{percentage of transmission of data } A \tag{4}$$

[Math. 5]
$$Y/\text{SUM}=\text{percentage of transmission of data } B \tag{5}$$

[Math. 6]
$$Z/\text{SUM}=\text{percentage of transmission of data } C \tag{6}$$

As described above, by taking measures, such as transmitting only data of a type considered to have a high impact on an inference result by using the threshold of the change amount of data and transmitting a variety of data at respective transmission rates allocated in accordance with their variance, it becomes possible to increase the accuracy of inference processing efficiently using the limited transmission band.

<Transmission Rate Control Processing>

Subsequently, transmission rate control processing performed between the upload terminal 1 and the cloud terminal 2 is described with reference to a flowchart of FIG. 24.

The processing illustrated in FIG. 24 is processing that the cloud terminal 2 performs with each upload terminal 1 in parallel with the processing illustrated in FIGS. 21 to 23. A transmission rate change command is outputted from the cloud terminal 2 to each upload terminal 1 in accordance with the state of processing performed in parallel. The upload terminal 1 having received the request from the cloud terminal 2 changes the transmission rate of data to be transmitted to the cloud terminal 2.

At Step S451, the control manager 131 of the cloud terminal 2 recognizes that the transmission rate of transmission data to be transmitted to the inference terminal 3 has been updated through the processing illustrated in FIGS. 21 to 23.

At Step S452, the control manager 131 requests the transmission manager 151 to transmit a transmission rate change command to the upload terminal 1.

At Step S461, the transmission manager 151 receives the request from the control manager 131.

At Step S462, the RTP/RTCP packetizer 153 generates an RTCP packet storing therein the transmission rate change command having the format illustrated in FIG. 10 in accordance with control by the transmission manager 151. The transmission rate change command includes an identifier of transmission data whose transmission rate is to be changed and information of the transmission rate. The transmission rate of each piece of transmission data indicated by the information included in the transmission rate change command is a transmission rate corresponding to, for example, the transmission rate determined through the processing illustrated in FIGS. 22 and 23.

At Step S463, the transmission manager 151 transmits the RTCP packet generated by the RTP/RTCP packetizer 193 to the upload terminal 1.

At Step S481, the transmission manager 41 of the upload terminal 1 receives the RTCP packet transmitted from the cloud terminal 2.

At Step S482, the RTP/RTCP packetizer 43 acquires the transmission rate change command by analyzing the RTCP packet, and transmits the transmission rate change command to the control manager 31.

At Step S491, the control manager 31 receives the transmission rate change command supplied from the RTP/RTCP packetizer 43.

At Step S492, the control manager 31 notifies the transmission manager 41 that the transmission rate of a specific type of transmission data is changed. The change of the transmission rate is made, for example, by adjusting the transmission timing in such a manner that the transmission period is extended when the transmission band is insufficient. Information indicating the changed transmission rate (transmission period) is outputted to the transmission manager 41.

At Step S483, the transmission manager 41 receives the notification from the control manager 31.

At Step S484, the transmission manager 41 updates information of the transmission rate of each piece of transmission data stored in the transmission database 42.

At Step S485, the transmission manager 41 notifies the control manager 31 that the transmission rate has been changed.

At Step S493, the control manager 31 receives the notification from the transmission manager 41, and ends the processing. Subsequent data transmission to the cloud terminal 2 is performed in accordance with the changed transmission rate.

<Effects>

As described above, by defining respective formats of an RTP packet and an RTCP packet, it becomes possible to perform network model learning processing and inference processing as real-time processing.

Furthermore, in the transmission system, switching of the network model and control of the transmission rate are performed in accordance with band variation of a transmission path. Accordingly, even in an environment where the state of the transmission path varies at all times as with the Internet and a wireless network, the inference terminal 3 is able to continuously perform inference processing and stabilize its accuracy.

At the point of time when the band of the transmission path becomes scarce, the inference terminal 3 saves past data, and performs processing to control the transmission rate or request the cloud terminal 2 to perform control in accordance with a change amount of data. Accordingly, the inference terminal 3 is able to perform inference processing using the past data with respect to data that the inference terminal 3 is unable to receive, and thus it is possible to avoid the inference processing being stopped.

Furthermore, the cloud terminal 2 performs processing to control the data transmission rate of each upload terminal 1 in accordance with the transmission rate of data actually used in the inference processing. Accordingly, it is possible to reduce the congestion associated with wasteful data transmission of the upload terminal 1. By suppressing the frequency of communication, power consumption of the upload terminal 1 is reduced.

5. OTHER EXAMPLES

The above-described series of processing may be performed by hardware, or may be performed by software. In a case where the series of processing is performed by software, a program included in the software is installed in a computer built into dedicated hardware or a general-purpose personal computer or the like.

The installed program is provided by being recorded on the removal medium 111 illustrated in FIG. 14 that includes an optical disc (such as a compact disc read-only memory (CD-ROM) or a digital versatile disc (DVD)), a semiconductor memory, or the like. Furthermore, it may be provided through wired or wireless transmission media such as a local area network, the Internet, and digital broadcasting. It is possible to install the program in the ROM 102 or the storage section 108 in advance.

It is to be noted that the program executed by a computer may be a program to cause the processing to be performed in chronological order in line with the order of description of the present specification, or may be a program to cause the processing to be performed in parallel or at necessary timing such as when a call has been made.

It is to be noted that in the present specification, a system means an aggregation of multiple components (devices, modules (parts), etc.), regardless of whether or not all the components are in the same chassis. Therefore, both multiple devices that are housed in separate chassis and are coupled through a network and one device including multiple modules housed in one chassis are a system.

It is to be noted that the effects described in the present specification are merely examples and not limitative, and there may be other effects.

The embodiment of the present technology is not limited to the foregoing embodiment, and may be modified in a variety of ways without departing from the scope of the present technology.

For example, the present technology may have a configuration of cloud computing that multiple devices share one function through a network and perform processing in cooperation.

Furthermore, each of the above-described steps of the flowcharts may be performed by one device, or may be shared and performed by multiple devices.

Moreover, in a case where one step includes multiple processes, the multiple processes included in the one step may be performed by one device, or may be shared and performed by multiple devices.

<Examples of Combination of Configurations>

The present technology may have the following configurations.

(1)

A transmitting terminal including:
a generator that generates a packet having a format that allows multiple pieces of transmission data to be stored together with identification information of a network model in a payload, the transmission data being used in at least one of learning processing of the network model by machine learning or inference processing based on the network model; and
a transmitter that transmits the packet.

(2)

The transmitting terminal according to (1), in which the generator stores, with respect to each type of the transmission data, identification information of the transmission data and information indicating a data length in the payload.

(3)

The transmitting terminal according to (1) or (2), in which the packet is an RTP packet.

(4)

The transmitting terminal according to any one of (1) to (3), further including a receiver that receives a control packet transmitted from a receiving-side terminal that receives the transmission data, the control packet including a control command specifying a transmission rate for each type of the transmission data in a payload,
in which the transmitter transmits each piece of the transmission data in accordance with the transmission rate specified in the control command.

(5)

A transmitting method implemented by a transmitting terminal, the transmitting method including:
generating a packet having a format that allows multiple pieces of transmission data to be stored together with identification information of a network model in a payload, the transmission data being used in at least one of learning processing of the network model by machine learning or inference processing based on the network model; and
transmitting the packet.

(6)

An information processing terminal including:
a generator that generates a control packet storing a control command regarding transmission of transmission data used in inference processing based on a network model in a payload, the control command including identification information of the network model and identification information of the control command; and
a transmitter that transmits the control packet.

(7)

The information processing terminal according to (6), in which the control packet is an RTCP packet.

(8)

The information processing terminal according to (6) or (7), further including:
a receiver that receives a packet storing the transmission data in a payload, the packet being transmitted from a transmitting-side terminal that transmits the transmission data; and
an inference processing section that performs the inference processing using the transmission data as an input.

(9)

The information processing terminal according to any one of (6) to (8), in which the generator generates the control packet that stores the control command to switch the network model used in the inference processing.

(10)

The information processing terminal according to any one of (6) to (8), in which the generator generates the control packet that stores the control command specifying a transmission rate for each type of the transmission data.

(11)

The information processing terminal according to (10), in which the generator generates the control command that includes, with respect to each type of the transmission data, identification information of the transmission data, information indicating a unit of the transmission rate, and a value of the transmission rate.

(12)

The information processing terminal according to (10) or (11), further including a controller that saves specific transmission data that becomes unable to be used in the inference processing by adjustment of the transmission rate being performed by the transmitting-side terminal, in which the inference processing section performs the inference processing using, as inputs, the transmission data transmitted after the adjustment of the transmission rate has been performed and the saved specific transmission data.

(13)

The information processing terminal according to any one of (6) to (8), in which the generator generates the packet that stores the control command requesting adjustment of the transmission rate in accordance with a change amount of the transmission data.

(14)

The information processing terminal according to (13), further including a controller that saves the transmission data to be an input of the inference processing, in which the inference processing section performs the inference processing using, as inputs, the transmission data transmitted after the adjustment of the transmission rate has been performed by the transmitting-side terminal and the saved transmission data.

(15)

An information processing method implemented by an information processing terminal, the information processing method including:

generating a control packet storing a control command regarding transmission of transmission data used in inference processing based on a network model in a payload, the control command including identification information of the network model and identification information of the control command; and transmitting the control packet.

(16)

An information processing terminal including:

a receiver that receives a control packet storing a control command regarding transmission of transmission data used in inference processing based on a network model in a payload, the control command including identification information of the network model and identification information of the control command; and a transmitter that transmits the transmission data in accordance with the control command.

(17)

The information processing terminal according to (16), in which in a case where the control command is a command to switch the network model used in the inference processing, the transmitter transmits a type of the transmission data used as an input of the switched network model indicated by the identification information of the network model included in the control command.

(18)

The information processing terminal according to (16), in which in a case where the control command is a command specifying a transmission rate for each type of the transmission data, the transmitter transmits each type of the transmission data in accordance with the transmission rate specified by information included in the control command.

(19)

The information processing terminal according to (16), in which in a case where the control command is a command requesting adjustment of a transmission rate in accordance with a change amount of the transmission data, the transmitter transmits a type of the transmission data having a change amount exceeding a threshold.

(20)

An information processing method implemented by an information processing terminal, the information processing method including:

receiving a control packet storing a control command regarding transmission of transmission data used in inference processing based on a network model in a payload, the control command including identification information of the network model and identification information of the control command; and transmitting the transmission data in accordance with the control command.

REFERENCE SIGNS LIST

1-1 to 1-N upload terminal
2 cloud terminal
3 inference terminal
4 network
31 control manager
32 transmission processing section
41 transmission manager
42 transmission database
43 RTP/RTCP packetizer
131 control manager
132 machine learning processing section
133 transmission processing section
141 machine learning manager
142 machine learning database
143 machine learning engine
151 transmission manager
152 transmission database
153 RTP/RTCP packetizer
171 control manager
172 inference processing section
173 transmission processing section
181 inference manager
182 inference database
182A network model set
183 inference engine
191 transmission manager
192 transmission database
193 RTP/RTCP packetizer

The invention claimed is:

1. A transmitting terminal, comprising:

circuitry configured to generate a specific packet, wherein
the specific packet includes a plurality of pieces of transmission data and identification information of a network model in a payload of the specific packet, and
the plurality of pieces of transmission data is for at least one of:
a machine learning process of the network model, or
an inference process based on the network model;
a transmitter configured to transmit the specific packet to a receiving-side terminal; and
a receiver configured to receive a control packet from the receiving-side terminal based on the transmitted specific packet, wherein the control packet includes a control command that specifies a transmission rate for each type of transmission data of the plurality of pieces of transmission data in the payload, and the transmitter is further configured to transmit each piece of transmission data of the plurality of pieces of transmission data based on the transmission rate specified in the control command.

2. The transmitting terminal according to claim 1, wherein the circuitry is further configured to control storage of:
   identification information, of each type of transmission data of the plurality of pieces of transmission data, in the payload, and
   information indicating a data length, of the each type of transmission data, in the payload.

3. The transmitting terminal according to claim 1, wherein the specific packet is a Real-Time Transport Protocol (RTP) packet.

4. A transmitting method, comprising:
   generating a specific packet that includes a plurality of pieces of transmission data and identification information of a network model in a payload of the specific packet, wherein
   the plurality of pieces of transmission data is for at least one of:
     a learning process of the network model by a machine learning process, or
     an inference process based on the network model;
   transmitting the specific packet to a receiving-side terminal;
   receiving a control packet from the receiving-side terminal based on the transmitted specific packet, wherein the control packet includes a control command that specifies a transmission rate for each type of transmission data of the plurality of pieces of transmission data in the payload; and
   transmitting each piece of transmission data of the plurality of pieces of transmission data based on the transmission rate specified in the control command.

5. An information processing terminal, comprising:
   a receiver configured to receive, from a transmitting-side terminal, a specific packet that includes a plurality of pieces of transmission data in a payload of the specific packet;
   circuitry configured to generate a first control packet based on the received specific packet, wherein
     the first control packet includes a second control command that specifies a transmission rate of each type of transmission data of the plurality of pieces of transmission data,
     the plurality of pieces of transmission data is for execution of an inference process based on information of a network model in the payload, and
     the second control command includes identification information of the network model and identification information of the second control command; and
   a transmitter configured to transmit the generated first control packet.

6. The information processing terminal according to claim 5, wherein the first control packet is a Real-Time Transport Control Protocol (RTCP) packet.

7. The information processing terminal according to claim 5, further comprising
   an inference processing section configured to execute the inference process based on the plurality of pieces of transmission data and the network model.

8. The information processing terminal according to claim 7, wherein the circuitry is further configured to generate a second control packet that includes a first control command to switch the network model.

9. The information processing terminal according to claim 7, wherein the second control command further includes identification information of each type of transmission data of the plurality of pieces of transmission data, information indicating a unit of the transmission rate, and a value of the transmission rate.

10. The information processing terminal according to claim 7, further comprising a controller, wherein
    the receiver is further configured to receive the plurality of pieces of transmission data after adjustment of the transmission rate by the transmitting-side terminal,
    the controller is configured to control storage of specific transmission data of the plurality of pieces of transmission data,
    the specific transmission data becomes unable to be used, in the inference process, by the adjustment of the transmission rate by the transmitting-side terminal, and
    the inference processing section is further configured to execute the inference process based on the plurality of pieces of transmission data received after the adjustment of the transmission rate and the stored specific transmission data.

11. The information processing terminal according to claim 7, wherein
    the circuitry is further configured to generate a second control packet,
    the second control packet includes a third control command that requests adjustment of the transmission rate, and
    the adjustment of the transmission rate is based on a change amount of the plurality of pieces of transmission data.

12. The information processing terminal according to claim 11, further comprising a controller, wherein
    the receiver is further configured to receive the plurality of pieces of transmission data after adjustment of the transmission rate by the transmitting-side terminal,
    the controller is configured to control storage of specific transmission data, of the plurality of pieces of transmission data, to be an input of the inference process, and
    the inference processing section is further configured to execute the inference process based on the plurality of pieces of transmission data received after the adjustment of the transmission rate by the transmitting-side terminal and the stored specific transmission data.

13. An information processing method comprising:
    receiving, from a transmitting-side terminal, a specific packet that includes a plurality of pieces of transmission data in a payload of the specific packet;
    generating a control packet based on the received specific packet, wherein
      the control packet includes a control command that specifies a transmission rate of each type of transmission data of the plurality of pieces of transmission data,
      the plurality of pieces of transmission data is for execution of an inference process based on information of a network model in the payload, and
      the control command includes identification information of the network model and identification information of the control command; and
    transmitting the generated control packet.

14. An information processing terminal, comprising:
    a receiver configured to receive a first control packet that includes a second control command, wherein the second control command specifies a transmission rate of each type of transmission data of a plurality of pieces of transmission data,
the plurality of pieces of transmission data is for execution of an inference process based on information of a network model, and
the second control command includes identification information of the network model and identification information of the second control command; and
a transmitter configured to transmit the plurality of pieces of transmission data based on the transmission rate specified in the second control command.

15. The information processing terminal according to claim 14, wherein
the receiver is further configured to receive a second control packet, wherein the second control packet includes a first control command to switch the network model,
the first control command includes the identification information of the network model,
the transmitter is further configured to transmit specific a specific type of transmission data of the plurality of pieces of transmission data based on the identification information of the network model in the first control command, and
the specific type of transmission data is an input of the switched network model indicated by the identification information of the network model in the first control command.

16. The information processing terminal according to claim 14, wherein
the receiver is further configured to receive a second control packet, wherein the second control packet includes a third control command,
the third control command requests adjustment of the transmission rate based on a change amount of the plurality of pieces of transmission data, and
the transmitter is further configured to transmit a specific type of transmission data, of the plurality of pieces of transmission data, having the change amount that exceeds a threshold value.

17. An information processing method, comprising:
receiving a control packet that includes a control command, wherein
the control command specifies a transmission rate of each type of transmission data of a plurality of pieces of transmission data,
the plurality of pieces of transmission data is for execution of an inference process based on information of a network model, and
the control command includes identification information of the network model and identification information of the control command; and
transmitting the plurality of pieces of transmission data based on the transmission rate specified in the control command.

* * * * *